US012766065B2

(12) United States Patent
Kuwata et al.

(10) Patent No.: US 12,766,065 B2
(45) Date of Patent: Oct. 20, 2026

(54) TORSO INTERFACE FOR A TRUNK SUPPORTING EXOSKELETON

(71) Applicant: suitX, Inc., Emeryville, CA (US)

(72) Inventors: John Kuwata, El Cerrito, CA (US); Wayne Yi-Wei Tung, Emeryville, CA (US); Minerva Pillai, Redwood City, CA (US); Michael McKinley, Berkeley, CA (US); Yi Zeng, Emeryville, CA (US); Zhendong Liu, Emeryville, CA (US); Jing-song Huang, Emeryville, CA (US); Logan Van Engelhoven, Emeryville, CA (US); Homayoon Kazerooni, Berkeley, CA (US); Markus Tüttemann, Duderstadt (DE); Fabienne Röschel, Duderstadt (DE); Oliver Mizera, Goettingen (DE); Maximiliam Merker, Goettingen (DE)

(73) Assignee: suitX, Inc., Emeryville, CA (US)

( * ) Notice: Subject to any disclaimer, the term of this patent is extended or adjusted under 35 U.S.C. 154(b) by 0 days.

(21) Appl. No.: 19/416,945

(22) Filed: Dec. 11, 2025

(65) Prior Publication Data

US 2026/0157913 A1 Jun. 11, 2026

Related U.S. Application Data

(63) Continuation of application No. PCT/US2025/050539, filed on Oct. 10, 2025.

(Continued)

(51) Int. Cl.
*A61H 1/02* (2006.01)

(52) U.S. Cl.
CPC ... *A61H 1/0292* (2013.01); *A61H 2201/0192* (2013.01); *A61H 2201/1621* (2013.01);

(Continued)

(58) Field of Classification Search
CPC .......... A61H 1/0292; A61H 2201/0192; A61H 2201/1621; A61H 2201/1626; A61H 2201/1652
See application file for complete search history.

(56) References Cited

U.S. PATENT DOCUMENTS 9,022,956 B2 5/2015 Kazerooni et al.
9,655,762 B2 5/2017 Kazerooni et al.

(Continued)

FOREIGN PATENT DOCUMENTS

KR 20170128712 A 11/2017
KR 20190004854 A 1/2019

(Continued)

OTHER PUBLICATIONS

International Application Serial No. PCT/US25/50539, Search Report and Written Opinion mailed Apr. 1, 2026, 19 pgs.

(Continued)

*Primary Examiner* — Tarla R Patel
(74) *Attorney, Agent, or Firm* — Polygon IP, LLP

(57) ABSTRACT

A torso interface for a trunk-supporting exoskeleton is disclosed. The interface includes a back panel, at least one harness configured to encircle the user's shoulders and torso, and a movable chest panel that transfers supportive forces from the exoskeleton to the user's trunk. The harness includes superior and lateral segments with an adjustment mechanism that maintains balanced tensile forces and consistent chest panel positioning during motion. Routing elements guide the harness to minimize friction and isolate tensile loads from the chest panel. The back panel may include spring-biased panels that automatically adjust to the user's torso width or height for improved comfort and fit. The torso interface may also include limiting and remote adjustment elements and a spine joint that allows or restricts rotation between the interface and exoskeleton frame. The (Continued)

system enhances ergonomic lumbar support while preserving natural torso mobility.

20 Claims, 18 Drawing Sheets

Related U.S. Application Data

(60) Provisional application No. 63/706,385, filed on Oct. 11, 2024.

(52) U.S. Cl.
CPC ................ *A61H 2201/1626* (2013.01); *A61H 2201/1652* (2013.01)

(56) References Cited

U.S. PATENT DOCUMENTS

| | | | | |
|---|---|---|---|---|
| 9,744,066 | B2 | 8/2017 | Kazerooni et al. | |
| 10,285,843 | B2 | 5/2019 | Yangyuenthanasan et al. | |
| 10,524,974 | B2 | 1/2020 | Tung et al. | |
| 2015/0335461 | A1 | 11/2015 | Kuromiya et al. | |
| 2017/0100626 | A1 | 4/2017 | Ko et al. | |
| 2018/0303699 | A1 | 10/2018 | Romo et al. | |
| 2018/0338881 | A1 | 11/2018 | Ohtsubo et al. | |
| 2019/0009405 | A1 | 1/2019 | Ko et al. | |
| 2019/0254910 | A1 | 8/2019 | Mizera et al. | |
| 2019/0358807 | A1 | 11/2019 | Ohta et al. | |
| 2020/0170822 | A1 | 6/2020 | Monden et al. | |
| 2020/0237600 | A1 | 7/2020 | Arai et al. | |
| 2021/0007874 | A1 | 1/2021 | Galiana et al. | |
| 2021/0069890 | A1* | 3/2021 | Grenier | A45F 3/10 |
| 2021/0077335 | A1 | 3/2021 | Yoshimi et al. | |
| 2021/0077839 | A1 | 3/2021 | Arai et al. | |
| 2021/0078162 | A1 | 3/2021 | Yoshimi et al. | |
| 2021/0322248 | A1 | 10/2021 | Puchades et al. | |
| 2021/0361516 | A1 | 11/2021 | Ohta et al. | |
| 2022/0008280 | A1 | 1/2022 | Tsuchida | |
| 2022/0040025 | A1 | 2/2022 | Yoshimi et al. | |
| 2022/0110814 | A1 | 4/2022 | Mooney et al. | |
| 2022/0216816 | A1 | 7/2022 | Lo et al. | |
| 2024/0189979 | A1* | 6/2024 | Ding | B25J 9/0006 |
| 2024/0308060 | A1* | 9/2024 | Proface | B25J 9/0006 |
| 2025/0073891 | A1 | 3/2025 | Tung et al. | |
| 2025/0248876 | A1 | 8/2025 | Tung et al. | |
| 2026/0102308 | A1 | 4/2026 | Tung et al. | |

FOREIGN PATENT DOCUMENTS

| | | | |
|---|---|---|---|
| KR | 20190018070 | A | 2/2019 |
| WO | 2023200815 | A1 | 10/2023 |
| WO | 2026080870 | A1 | 4/2026 |
| WO | 2026080874 | A1 | 4/2026 |

OTHER PUBLICATIONS

International Application Serial No. PCT/US25/50545, Search Report and Written Opinion mailed Apr. 1, 2026, 24 pgs.
International Application Serial No. PCT/US25/50539, Invitation to Pay Additional Fees mailed Feb. 9, 2026, 13 pgs.
International Application Serial No. PCT/US25/50545, Invitation to Pay Additional Fees mailed Feb. 10, 2026, 24 pgs.

* cited by examiner

TORSO INTERFACE FOR A TRUNK SUPPORTING EXOSKELETON

CROSS-REFERENCE TO RELATED APPLICATIONS

This application is a continuation of PCT Application No. PCT/US 25/50539 filed on 2025 Oct. 10, which claims the benefit under 35 U.S.C. § 119(e) of US Provisional Patent Application 63/706,385, filed on 2024 Oct. 11, both of which are incorporated herein by reference in their entirety for all purposes.

FIELD OF TECHNOLOGY

The present disclosure pertains to the art of exoskeletons to support the human body, particularly to exoskeletons configured to reduce the bending moment on a person's back during a forward bend.

BACKGROUND

Exoskeletons are used to assist people in bending, standing upright, or any combination of these movements. Conventional exoskeletons are designed such that a moment is created during a bend to counteract the moments from a person's trunk gravity weight. These exoskeletons may utilize passive spring resistance or active motor resistance to create a torque between the person's trunk and legs. Some exoskeletons may also utilize a rigid frame with defined rotation axes, or a flexible interface to apply the supportive torque to the person such that it acts about the person's hip or lower back to reduce the probability of injury to the spine. To comfortably apply the supportive torque, an exoskeleton must move in tandem with both the thighs and the trunk of the user and minimize relative motion between the exoskeleton and the person that would otherwise cause rubbing, chafing, or general discomfort. In addition to creating the supporting torque about the hips and lower back, a secondary aim of the exoskeleton is to allow free movement of the person's trunk during non-bending motions such as twisting, side bending, or walking. A key component to providing both support during bending and free motion during other activities is the exoskeleton spine and upper torso coupling.

The present disclosure also relates to exoskeletons or wearable devices in general, as many of the described embodiments can apply to supporting various body parts and motions other than the examples given.

SUMMARY

The present disclosure is directed to an exoskeleton, which is configured to be worn by a person to reduce the muscle forces in the person's back during forward lumbar flexion. The trunk supporting exoskeleton comprises a frame that transfers weight or supporting forces and torques to the person. The frame generally encompasses a torso frame configured to be attached to the trunk of a person, two thigh links configured to be attached to the right and left thighs of a person, and a hip joint allowing the thigh links to move or rotate relative to the torso frame. An actuator is configured to apply a torque about the hip joint, the actuator comprising a means for creating a force or torque that is distributed through the exoskeleton frame in order to support a motion of the person. The frame is attached to the person with a human-machine interface. The human machine interface comprises the strapping, padding, cuffs, etc. that comfortably transfer the weights, forces, and torques from the exoskeleton frame to the body of the person.

Clause 1. A torso interface 122 for an exoskeleton 100, the torso interface 122 comprising: a back panel 140 configured to locate behind a back of a person 200 when the exoskeleton 100 is worn by the person 200; a harness 130 configured to transfer tensile forces and to at least partially encircle a shoulder of the person 200, the harness 130 coupled to the back panel 140 in at least two locations; a chest panel 126 moveably coupled to the harness 130, the chest panel 126 configured to contact a chest of the person 200 when the exoskeleton 100 is worn by the person 200, wherein the chest panel 126 separates the harness 130 into a superior segment 131, located above the shoulder, and a lateral segment 132, located beside a trunk of the person; and an adjustment mechanism 135 configured to adjust a length of the harness 130, the adjustment mechanism located along the superior segment 131 or between connection of the superior segment 131 and the back panel 140, wherein the adjustment mechanism 135 allows for a length adjustment of the superior segment 131 and an indirect length adjustment of the lateral segment 132 through motion of the chest panel 126 along the harness 130.

Clause 2. The torso interface 122 of clause 1, wherein, when the person 200 bends while wearing the exoskeleton 100, the chest panel 126 slides along the harness 130 such that the chest panel 126 remains in the same location on the chest of the person.

Clause 3. The torso interface of clause 1, wherein, when the person 200 wears the exoskeleton 100, the chest panel 126 slides along the harness 130 such that tensile forces in the superior segment 131 and tensile forces in the lateral segment 132 remain balanced.

Clause 4. The torso interface 122 of clause 1, wherein the torso interface 122 is configured to apply a support torque 215 created by the exoskeleton 100 to the person 200 as a supportive force 230 on the chest of the person 200, wherein: the back panel 140 is configured to receive reaction forces and torques from a supporting torque 215 of the exoskeleton 100, and the chest panel 126 is configured to distribute tensile forces in the harness 130 as the supportive force 230 on the chest of the person 200.

Clause 5. The torso interface of clause 4, wherein, when the chest panel 126 transfers the supportive force 230 to the person 200, the chest panel 126 slides along the harness 130 such that tensile forces in the superior segment 131 and the tensile forces in the lateral segment 132 are balanced.

Clause 6. The torso interface 122 of clause 1, wherein: the superior segment 131 connects to the back panel 140 substantially along an outer profile 260 of the torso between a neck and the shoulder of the person 200, and the lateral segment 132 connects to the back panel 140 substantially along the outer profile 260 of the torso between an armpit and a waist of the person.

Clause 7. The torso interface 122 of clause 6, wherein the back panel 140 is substantially rigid such that neither the superior segment 131 nor the lateral segment 132 acts to compress the torso near the back panel 140 when tensile forces are transferred through the harness 130.

Clause 8. The torso interface 122 of clause 7, wherein the back panel 140 further comprises: a first panel 141; a second panel 142 coupled to the harness 130 and moveably coupled to the first panel 141; and a spring 143 configured to bias the second panel 142 towards the first panel 142, wherein: when the exoskeleton 100 is worn by the person 200, tensile forces in the harness 130 balance with forces from the spring 143 such that a connection between the harness 130 and the second panel 142 is substantially along the outer profile 260 of the torso.

Clause 9. The torso interface 122 of clause 1, wherein the back panel 140 is rotatably coupled to the exoskeleton 100 approximately at a level of a transition between a lumbar section 211 and a thoracic section 212 of a spine.

Clause 10. The torso interface 122 of clause 1, further comprising a linear joint 118 coupling the torso interface 122 to torso frame 102 such that the torso interface 122 can move relative to torso frame 102 along a linear direction 216, wherein: when the torso interface 122 is at a first position relative to the exoskeleton 100 along the linear direction 216, the torso interface 122 is able to rotate relative to the exoskeleton 100 in at least one direction, and when the torso interface 122 is at a second position relative to the exoskeleton 100 along the direction 216, movement between the torso interface 122 and the exoskeleton 100 is damped, spring-loaded, or fixed in the at least one direction.

Clause 11. The torso interface 122 of clause 1, further comprising a routing element 137 coupled to the chest panel 126, the routing element 137 configured to route the harness 130 such that no tensile forces are transferred through the chest panel 126 and the chest panel 126 freely slides along the harness 130.

Clause 12. The torso interface 122 of clause 11, wherein the routing element 137 is made of a low-friction material and defines a bend radius 237 in the harness 130 such that the chest panel 126 is able to freely move along the harness 130.

Clause 13. The torso interface 122 of clause 1, further comprising: an additional harness 139 coupled to the back panel 140 and configured to at least partially encircle an additional shoulder of the person 200; an additional chest panel 129, configured to slide relative to the additional harness 139; and a sternum strap 127, configured to connect the chest panel 126 and the additional chest panel 129.

Clause 14. The torso interface 122 of clause 13, further comprising: a routing element 137 coupled to the chest panel 126, the routing element 137 configured to route the harness 130 such that no tensile forces are transferred through the chest panel 126 and the chest panel 126 freely slides along the harness 130; and an additional routing element 134 coupled to the additional chest panel 129, the additional routing element 134 configured to route the additional harness 139 such that no tensile forces are transferred through the additional chest panel 129 and the additional chest panel 129 freely slides along the additional harness 139, wherein: the sternum strap 127 is configured to connect the routing element 137 to the additional routing element 134 such that no tensile forces are transferred through the chest panel 126 or the additional chest panel 139.

Clause 15. The torso interface 122 of clause 14, wherein the routing element 137 comprises one or more components selected from the group consisting of a metal D-ring, a plastic D-ring, a tri-ring, a circular ring, a rectangular ring, a loop, a pulley, a bent tube, a block, and a sheave.

Clause 16. The torso interface 122 of clause 1, further comprising a limiting element 124 configured to selectively prevent the chest panel 126 from sliding relative to the harness 130 in at least one direction.

Clause 17. The torso interface 122 of clause 16, wherein: the limiting element 124 prevents the chest panel 126 from moving along the harness 130 only in a direction that corresponds to shortening of the superior segment 131 and lengthening of the lateral segment 132.

Clause 18. The torso interface 122 of clause 17, wherein the limiting element 124 comprises a strap coupled between the chest panel 126 and the belt 121 of the exoskeleton 100 or person 200.

Clause 19. The torso interface 122 of clause 18, wherein the limiting element 124 is adjustable in length to fit various sizes of the person 200 or to position the chest panel 126 at different levels on the chest of the person 200.

Clause 20. The torso interface 122 of clause 17, wherein the limiting element 124 is configured between the chest panel 126 and the harness 130 and comprises one or more selected from the group consisting of a clamp, a cam lock, a ladder lock, a cleat, a triglide, a screw, a pin, a clutch, and a ratcheting pulley.

Clause 21. The torso interface 122 of clause 1, wherein: the harness 130 is made of one or more materials selected from the group consisting of a webbing, a cable, a rope, a twine, a textile material, and a flexible weave, and the one or more materials of the harness 130 are configured to conform to the shape of the person 200.

Clause 22. The torso interface 122 of clause 1, wherein the chest panel 126 further comprises a chest pocket 191 configured to enclose at least a portion of the superior segment 131 or the lateral segment 132.

Clause 23. The torso interface 122 of clause 22, wherein the chest pocket 191 is lined with a low-friction material to aid in the sliding of the chest panel 126 along the harness 130.

Clause 24. A torso interface 122 for an exoskeleton 100, the torso interface 122 comprising: a back panel 140 configured to locate behind a back of a person 200 when the exoskeleton 100 is worn by the person 200; a chest panel 126 configured to contact a chest of the person 200 and apply a supportive force 230; a superior segment 131 coupling the chest panel 126 to the back panel 140 and configured to sit above a shoulder of the person 200; an adjustment mechanism 135 configured to adjust a length of the superior segment 131; a lateral segment 132 coupling the chest panel 126 to the back panel 140 and configured to sit along a side of the chest of the person 200, the lateral segment 132 configured to slide relative to the back panel 140; a connection element 136 comprising a coupling segment and an adjustment segment such that the coupling segment is routed between the lateral segment 132 and the back panel 140; a connection routing element 192 configured to route the adjustment segment of the connection element 136 to the chest panel 126 or the superior segment 131; and an adjustment element 138 mounted on or near the chest panel 126 or superior segment 131 and configured to adjust and fix a length of the connection element 136; wherein the adjustment element 138, connection element 136, and connection routing element 192 are configured to control a position between the lateral segment 132 and the back panel 140.

Clause 25. The torso interface 122 of clause 24, wherein the connection element 136 comprises one or more inextensible components selected from the group consisting of a rope, a cable, a twine, a chain, a wire, a webbing, and a chord.

Clause 26. The torso interface 122 of clause 24, wherein the connection routing element 192 comprises one or more selected from the group consisting of a low-friction tubing, a bowden tubing, a pulley, a rounded edge, and a drum.

Clause 27. The torso interface 122 of clause 24, wherein the adjustment element 138 comprises one or more components selected from the group consisting of a lockable clutch, a cleat, and a jammer.

Clause 28. The torso interface 122 of clause 24, wherein: the back panel 140 comprises a pocket 147, and the lateral segment 132 is configured to slide horizontally within the pocket 147 of the back panel 140.

Clause 29. The torso interface 122 of clause 24, wherein the lateral segment 132 is able to pivot and slide relative to the back panel 140.

Clause 30. The torso interface 122 of clause 24, wherein the chest panel 126 is integrated into the lateral segment 132.

Clause 31. A torso interface 122 for an exoskeleton 100, the torso interface 122 comprising: a back panel 140 configured to locate behind a back of a person 200 when the exoskeleton 100 is worn by the person 200; a chest panel 126 configured to contact a chest of the person 200 when the exoskeleton 100 is worn by the person 200; a first segment 132 coupling the chest panel 126 to the back panel 149 and configured to sit along a side of the chest of the person 200, the first segment 132 configured to slide relative to the back panel 140; a connection element 136 with a coupling segment routed between the first segment 132 and the back panel 140; a connection routing element 192 configured to route the connection element 136 to the chest panel 126; and an adjustment element 138 mounted on or near the chest panel 126 or a second end of the connection element configured to adjust and fix a length of the connection element 136, wherein the connection element 136, adjustment element 138, and connection routing element 192 are configured to control a position between the first segment 132 and the back panel 140.

Clause 32. A torso interface 122 for an exoskeleton 100, the torso interface 122 comprising: a back panel 140 configured to locate behind a back of a person 200 when the exoskeleton 100 is worn by the person 200, wherein the back panel 140 further comprises: a first panel 141, a second panel 142 moveably coupled to the first panel 141, and a spring 143 configured to bias the second panel 142 towards the first panel 142; and a harness 130 connected between the first panel 141 and the second panel 142 from the harness 130 configured to at least partially encircle a shoulder of the person 200, wherein: when the exoskeleton 100 is worn by the person 200, tensile forces from the harness 130 balance with forces from the spring 143 such that the second panel 142 is positioned relative to the first panel 141 in a way that minimizes a profile of the back panel 140 on the person or forces from the harness 130 that squeeze a body of the person 200, or when the exoskeleton 100 is worn by the person 200, tensile forces from the harness 130 balance with forces from the spring 143 such that the second panel 142 is positioned relative to the first panel 141 in a way where the harness 130 pulls orthogonally to a frontal plane 250 of the person from at least one end.

Clause 33. A torso interface 122 for an exoskeleton 100, the torso interface 122 comprising: a back panel 140 configured to locate behind a back of a person when the exoskeleton 100 is worn by the person, wherein the back panel 140 further comprises: a central element 144, a first panel 141 moveably coupled to the central element 144 along a first side of the person 200, a second panel 142 moveable coupled to the central element 144 along a second side of the person 200, and a spring 143 configured to bias the second panel 142 towards the first panel 141; a first harness 130 connected to the first panel 141 configured to at least partially encircle a first shoulder of the person 200; and an additional harness 139 connected to the second panel 142 and configured to at least partially encircle a second shoulder of the person 200, wherein: when the exoskeleton 100 is worn by the person 200, forces from the harness 130 balance with forces from the spring 143 such that the second panel 142 is positioned relative to the first panel 141 in a way that minimizes a profile of the back panel 140 on the person 200 or forces from the harness 130 that squeeze the person 200.

Clause 34. An exoskeleton 100 configured to at least partially support a trunk of a person 200, the exoskeleton 100 comprising: an actuator 101 configured to generate a support torque 215; a torso frame 103 coupled to the actuator 101 configured to transfer the support torque 215; and a torso interface 122 coupled to the torso frame 102 configured to apply the support torque 215 to the person as a supportive force 230, the torso interface 122 comprising: a harness 130 configured to at least partially encircle a shoulder of the person 200, and a chest panel 126 moveably coupled to the harness 130, the chest panel 126 configured to apply the supportive force 230 to a chest of the person 200 when the exoskeleton 100 is worn by the person 200, wherein the chest panel 126 separates the harness 130 into a superior segment 131 located above the person's shoulder and a lateral segment 132 located beside the torso, wherein: when the chest panel 126 transfers the supportive force 230 to the person 200, the chest panel 126 slides along the harness 130 such that tensile forces in the superior segment 131 and the lateral segment are balanced, when the person 200 bends while wearing the exoskeleton 100, the chest panel 126 slides along the harness 130 such that the tensile forces in the superior segment 131 and the lateral segment 132 remain balanced, or when the person 200 bends while wearing the exoskeleton 100, the chest panel 126 slides along the harness 130 such that the chest panel 126 remains in a same location on the chest of the person.

Clause 35. An exoskeleton 100 configured to be worn by a person 200, the exoskeleton 100 comprising: a torso frame 102 configured to sit behind the person 200 and at least partially surround a pelvis 210 of the person; a thigh link 104 rotationally coupled to the torso frame 102 about a hip axis 108 and configured to follow flexion and extension motion of a thigh 204 of the person; and a torso interface 122 rotatably coupled to the torso frame 122 approximately at a level of transition between a lumbar section 211 to a thoracic section 212 of a spine of the person.

Clause 36. The exoskeleton 100 of clause 35, wherein the torso interface 122 is configured to rotate relative to the torso frame 122 about an axis parallel with the hip axis 108.

Clause 37. An exoskeleton 100 configured to be worn by a person 200, the exoskeleton 100 comprising: a torso frame 102 configured to sit behind the person 200; a torso interface 122 configured to be coupled to a trunk of the person 200; and a linear joint 118 coupling the torso frame 102 to the torso interface 122 such that the torso interface 122 can move along a linear direction 216 relative to the torso frame 102, wherein: when the torso interface 122 is at a first position relative to the torso frame 102 along the linear direction 216, the torso interface 122 can rotate relative to the torso frame 102 in at least one direction, and when the torso interface 122 is at a second position relative to the torso frame 102 along the linear direction 216, movement between the torso interface 122 and the torso frame 102 is damped, spring-loaded, or fixed in the at least one direction.

Clause 38. The exoskeleton 100 of clause 37, wherein the torso interface 122 is coupled to the torso frame 102 with a swivel joint 119 that allows rotation in three directions when the torso interface 122 is at a first position relative to the torso frame 102.

Clause 39. The exoskeleton 100 of clause 38, wherein when the torso interface 122 is at a second position relative to the torso frame 102 along the linear direction 216, the movement between the torso interface 122 and the torso frame 102 is damped, spring-loaded, or fixed in all three directions.

Clause 40. The exoskeleton of clause 37, wherein the torso interface 122 is spring-loaded relative to the torso frame 102 along the linear direction 216 into the first position.

The embodiments disclosed herein may be applied to multiple types of exoskeletons, including passive devices and devices with one, two, or more actuators. This application adds additional utility to exoskeleton devices, particularly exoskeleton devices. These and other embodiments are described further below with reference to the figures.

BRIEF DESCRIPTION OF THE DRAWINGS

The included drawings are for illustrative purposes and serve only to provide examples of possible structures and operations for the disclosed inventive systems and methods. These drawings in no way limit any changes in form and detail that may be made by one skilled in the art without departing from the spirit and scope of the disclosed implementations.

DETAILED DESCRIPTION

Figure 1:
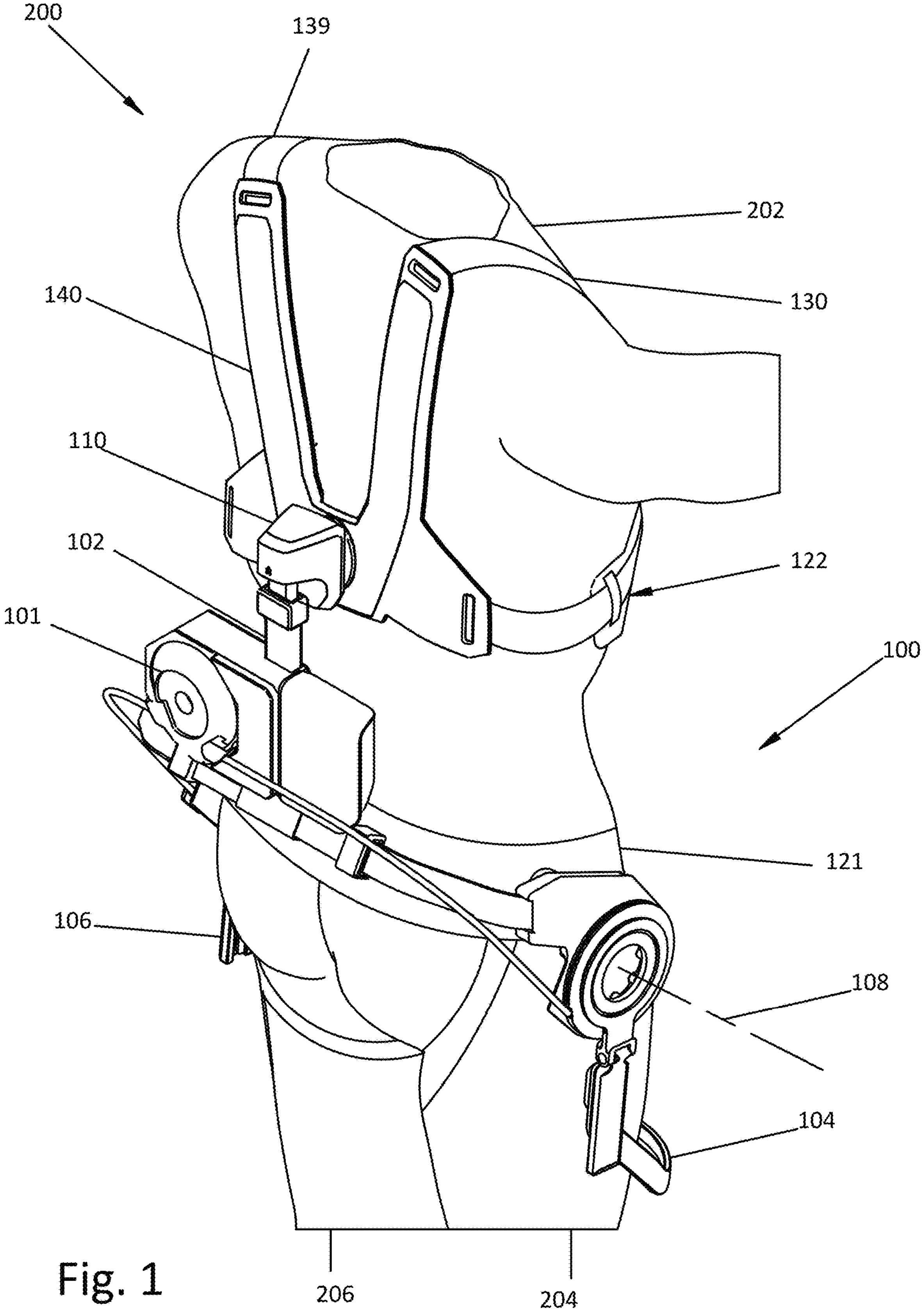
FIG. 1 depicts a rear perspective view of a trunk support exoskeleton with a torso interface, in accordance with some examples.

FIG. 1 shows an exoskeleton 100 with a torso interface 122 worn by a person 200. In some examples, exoskeleton 100 is a trunk supporting exoskeleton to reduce muscle forces in the back of person 200 during forward lumbar flexion, which occurs during maneuvers such as stooping and bending. Exoskeleton 100 can include a torso frame 102 configured to be coupled to trunk 202 of person 200, a first thigh link 104 and a second thigh link 106 configured to be coupled to respective thighs 204 and 206 of person 200, and an actuator 101 that generates an extension torque between first thigh link 104 and torso frame 102 and between second thigh link 106 and torso frame 102.

Figure 2:
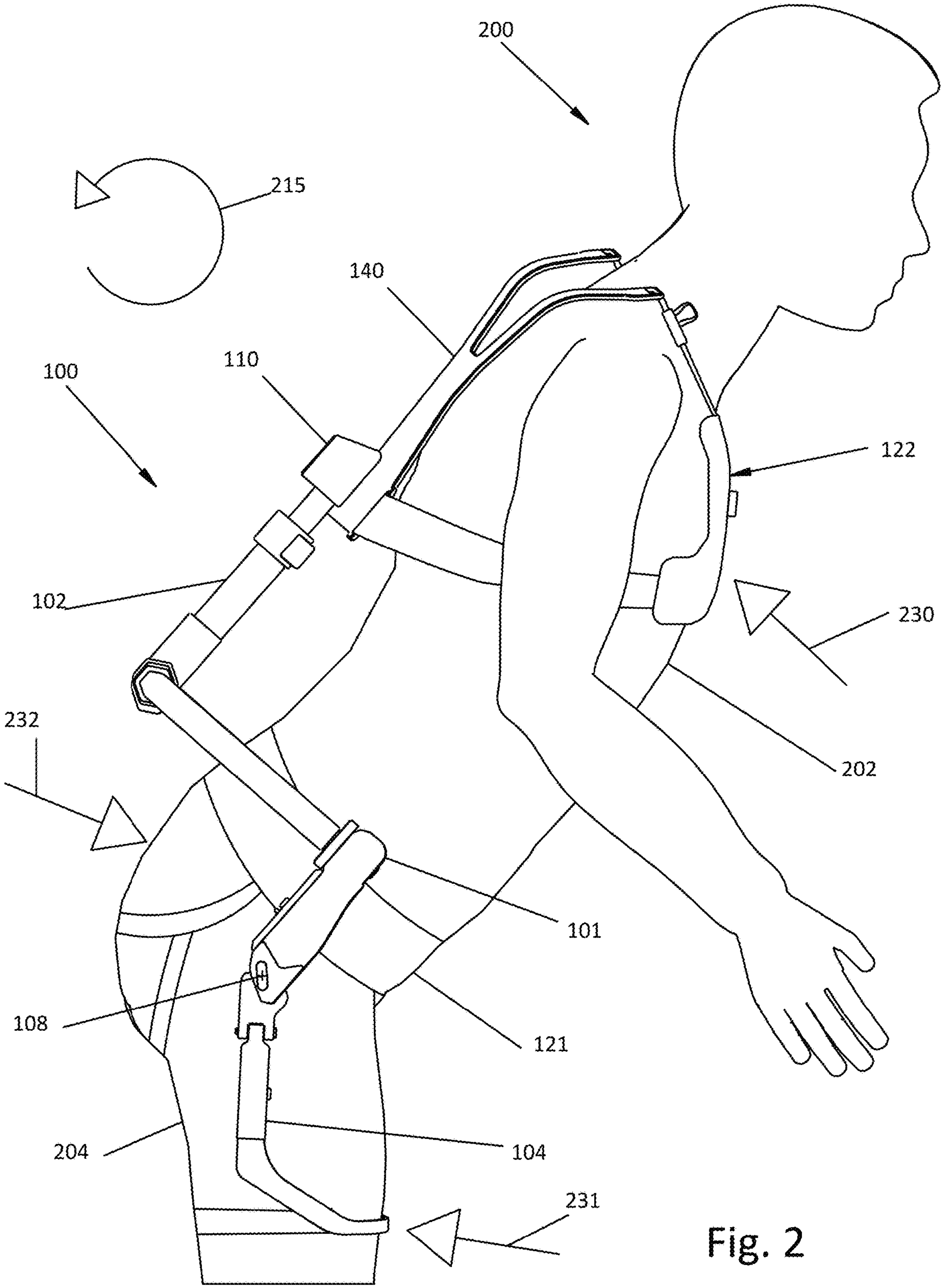
FIG. 2 depicts a side view of the trunk support exoskeleton and its forces exerted on a person, in accordance with some examples.

FIG. 2 shows person 200 wearing exoskeleton 100 bent forward in a sagittal plane 300. In this position, forward lumbar flexion is taking place. To support the weight of a person's trunk against the forces of gravity, exoskeleton 100 applies supportive torque 215 as a supportive force 230 to the chest of person 200 through torso interface 122. Reaction forces are also applied to the hips and thighs of person 200 as described in the prior art. Exoskeleton 100 may apply these supportive forces in response to bending motions during activities common in working or in daily life.

As shown in FIG. 1 and FIG. 2, exoskeleton 100 can include first thigh link 104 and second thigh link 106, which are configured to be coupled to respective thighs 204 and 206 of person 200. When first thigh link 104 and second thigh link 106 are coupled to respective thighs 204 and 206, first thigh link 104 and second thigh link 106 move in unison with the person's thighs 204 and 206, respectively, in a manner resulting in flexion and extension of respective first thigh link 104 and second thigh link 106 relative to torso frame 102. In some examples, first thigh link 104 and second thigh link 106 are rotatably coupled to torso frame 102 such that the first thigh link 104 and second thigh link 106 can flex or extend relative to torso frame 102 about hip axis 108. Following the direction of supportive torque 215 in FIG. 2, flexion of first thigh link 104 relative to torso frame 102 occurs when first thigh link 104 and torso frame 102 rotate towards each other. Similarly, flexion of second thigh link 106 relative to torso frame 102 occurs when second thigh link 106 and torso frame 102 rotate towards each other. Opposite to the direction of supportive torque 215 in FIG. 2, extension of first thigh link 104 relative to torso frame 102 occurs when first thigh link 104 and torso frame 102 rotate away from each other. Similarly, extension of the second thigh link 106 relative to the torso frame 102 occurs when the second thigh link 106 and torso frame 102 rotate away from each other.

Exoskeleton 100 can also include actuator 101. In some examples, actuator 101 can generate supportive torque 215 between first thigh link 104 and torso frame 102 and between second thigh link 106 and torso frame 102. This causes torso interface 122 to provide supportive force 230 to the person's trunk and thigh link 104 to provide thigh reaction force 231 to the person's thigh 204 during lumbar flexion. Actuator 101 may be coupled to torso frame 102, thigh links 104, 106, between torso frame 102 and thigh links 104, 106, or to torso interface 122 or belt 121. Actuator 101 may be powered or passive, using one or a combination of motors, pneumatics, hydraulics, elastomers, or springs. Actuator 101 may be a single unit providing torque to both legs, or exoskeleton 100 may comprise multiple actuators, such as one to provide support for each leg.

Some aspects, the torso interface 122 is connected to the trunk 202 of person 200, and between exoskeleton 100 and trunk 202 of person 200. In some examples, torso frame 102 is configured to sit behind the person's trunk 202. Torso frame 102 may be made of substantially rigid or semi-rigid materials to effectively transfer torque from actuator 101 acting about hip axis 108 to torso interface 122. Torso interface 122 is configured to couple torso frame 102 to trunk 202 of person 200. Torso interface 122 is comprised of flexible or semi-rigid textiles to adjust and conform to the person's trunk and to comfortably apply support force 230 from exoskeleton 100 to person 200. The coupling between torso interface 122 and torso frame 102 allows for the support forces and torques to be transferred while allowing substantially free motion so that person 200 is not restricted while wearing exoskeleton 100. As used here and elsewhere in this disclosure, trunk 202 of person 200 can include the person's chest, abdomen, shoulders, and back. Trunk 202 of person 200 can be, for example, the person's body apart from the head and limbs, or the central part of the person from which the neck and limbs extend.

As shown in FIG. 1 and FIG. 2, exoskeleton 100 further comprises belt 121 configured to couple to the hips of person 200. In some examples, belt 121 is pivotally coupled to torso frame 102 near hip axis 108 along an axis substantially parallel to hip axis 108. Belt 121 helps to apply belt reaction force 232 to the buttocks of person 200, which helps prevent the exoskeleton 100 from slipping on person 200 while bending. Belt 121 further serves to transfer the weight of the exoskeleton 100 to the hips of person 200 to prevent the exoskeleton from slipping while person 200 is standing or walking. Belt 121 may comprise additional straps that connect to thigh link 104, 106 between or around the side of the legs of person 200.

Figure 3:
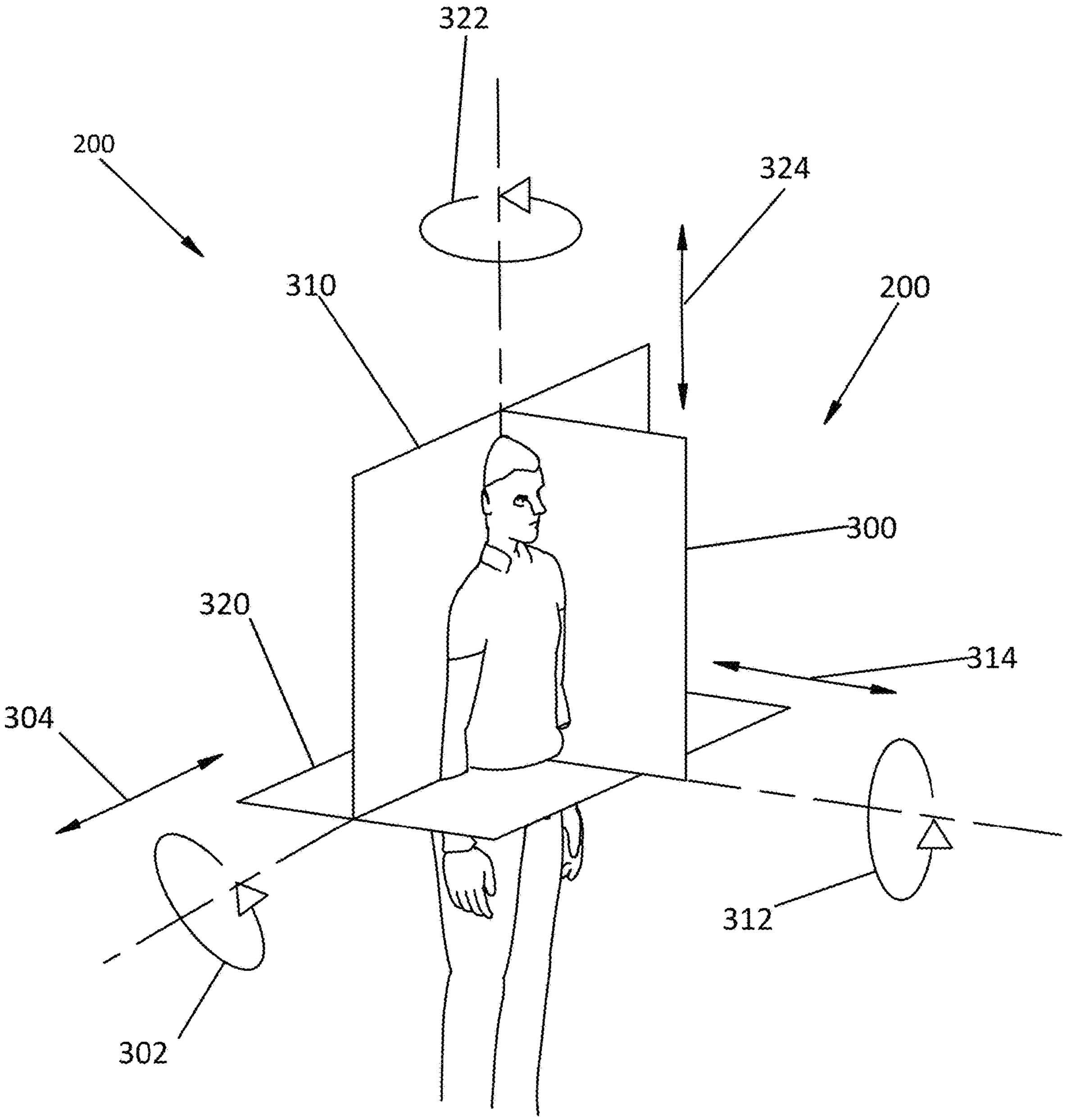
FIG. 3 depicts the planes and motions of a person, in accordance with some examples.

FIG. 3 depicts the definition of various planes and motions relative to person 200. The same planes and motions may similarly describe exoskeleton 100, as if exoskeleton 100 is worn by person 200. All planes are depicted as crossing through a midpoint of person 200 for clarity, but may be shifted to divide person 200 differently as long as they remain parallel to the depiction shown in FIG. 3. Sagittal plane 300 divides person 200 into right and left portions, and when viewed orthogonally, it depicts a side view of person 200 or an exoskeleton 100. Sagittal rotation motion 302 corresponds to a rotation along an axis orthogonal to sagittal plane 300. Flexion/extension of the person's hips, lower spine, upper spine, or neck may have a component of sagittal rotation motion 302. Forward bending motion of person 200 is another example of sagittal rotation motion 302, which may be a combination of movement from the person's hips and spine. Sagittal translation motion 304 corresponds to a translation motion orthogonal to sagittal plane 300. Sagittal translation motion 304 may also be referred to as moving right and/or left. Motions such as side bending or walking may have a component of sagittal translation motion 304. Frontal plane 310 divides person 200 into front and back portions, and when viewed orthogonally, depicts a front or a back view of person 200 or an exoskeleton 100. Frontal rotation motion 312 corresponds to a rotation along an axis orthogonal to the frontal plane 310. Motions of a person 200 such as side bending or walking, may have a component of frontal rotation motion 312. Frontal translation motion 314 corresponds to a translation motion orthogonal to the frontal plane 310. Frontal translation motion 314 may also be referred to as moving forward or backward. Flexion/extension of the person's hips, lower spine, and upper spine may have a component of frontal translation motion 314. Transverse plane 320 divides person 200 into upper and lower portions, and when viewed orthogonally, depicts a top or bottom view of person 200 or an exoskeleton 100. Transverse rotation motion 322 corresponds to a rotation along an axis orthogonal to the transverse plane 320. Twisting and walking of a person 200 may have a component of transverse rotation motion 322. Transverse translation motion 324 corresponds to a translation motion orthogonal to the transverse plane 320. Transverse translation motion 324 may also be referred to as moving up or down. Walking may correspond to transverse translation motion 324. Misalignment between an exoskeleton 100 and a person 200 may correspond to any of the motions depicted in FIG. 3, particularly the transverse translation motion 324, sagittal rotation motion 302.

Figure 4:
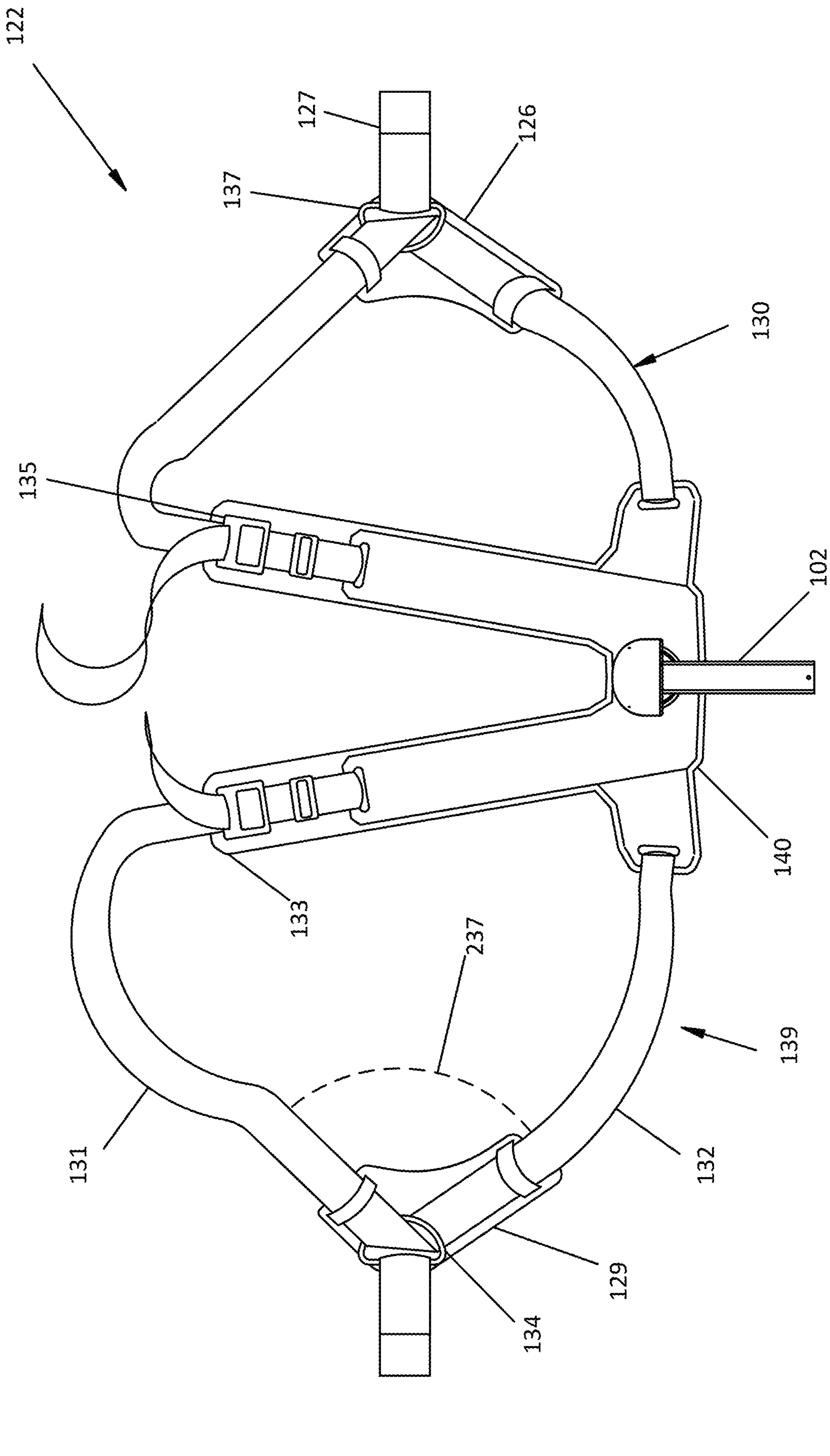
FIG. 4 depicts a torso interface, in accordance with some examples.
Figure 5:
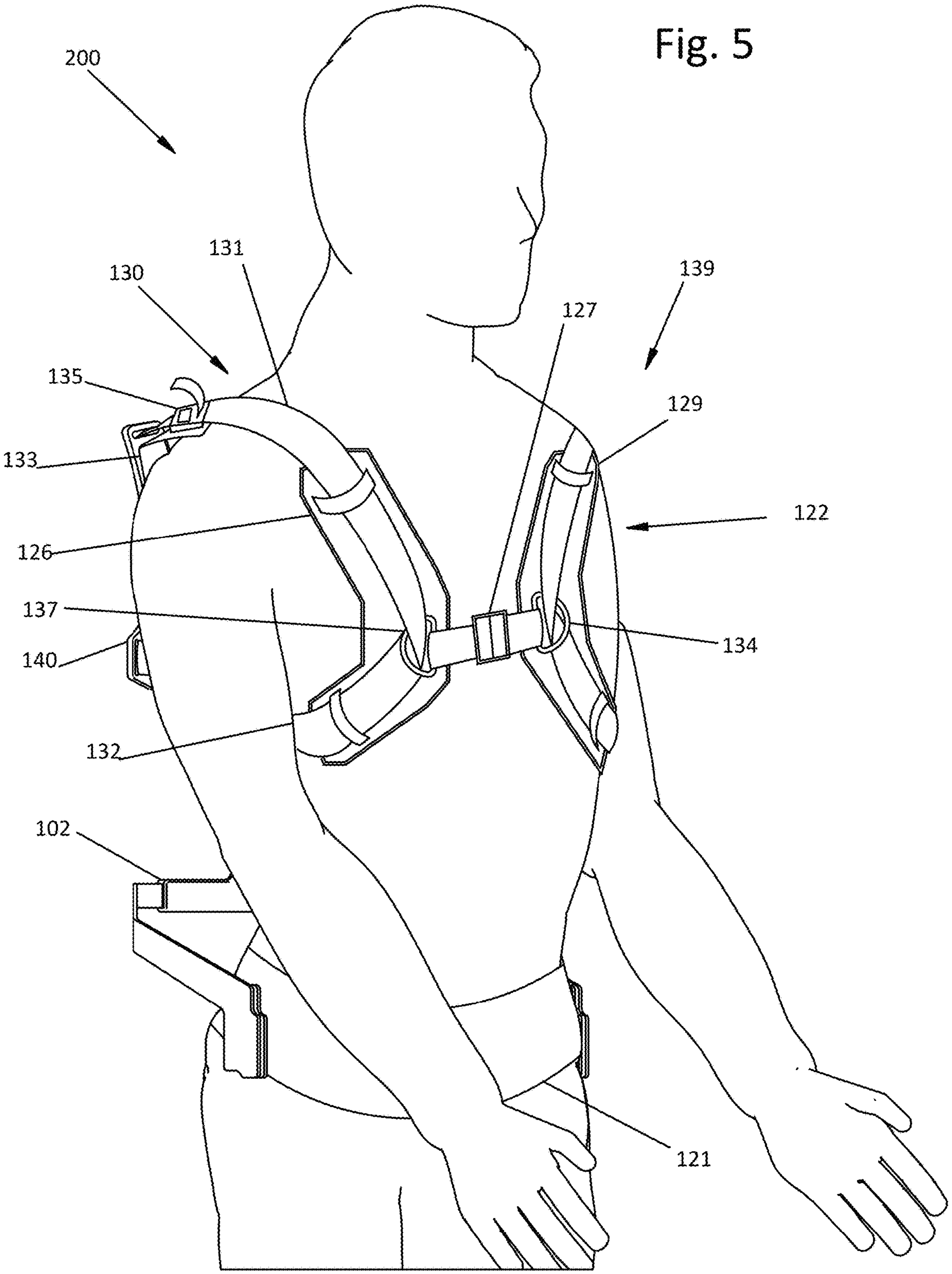
FIG. 5 depicts a front perspective view of the torso interface on a person, in accordance with some examples.

FIG. 4 shows a rear view of torso interface 122 as a flattened pattern to better show the connection between individual components. FIG. 5 shows a front perspective view of torso interface 122 on person 200. Torso interface 122 comprises back panel 140 that is configured to attach to torso frame 102. Back panel 140 is made of a substantially rigid material. Being substantially rigid allows back panel 140 to effectively transfer support forces from torso frame 102 to tensile forces in harness 130 and additional harness 139. Being substantially rigid allows back panel 140 to transfer forces and torques without flexing in a manner that interferes with person 200 or causes back panel 140 to break. Back panel 140 may also comprise padding 133 along portions that contact person 200. Torso interface 122 further comprises at least one harness 130 configured to at least partially encircle the trunk 202 of person 200. Harness 130 mounts to back panel 140 from at least two locations and is made of a flexible but substantially inextensible material to wrap around the contours of trunk 202 and transfer supportive forces from back panel 140. Torso interface 122 further comprises at least one chest panel 126 coupled to harness 130 configured to comfortably disburse and apply supportive forces to the front of trunk 202 of person 200 while avoiding sensitive areas such as the breast, collar bone, and armpit. Chest panel 126 may further comprise padding to more comfortably disburse forces to person 200. In some examples, harness 130 is configured to at least partially encircle the shoulders of person 200, and chest panel 126 is configured to sit in a pectoral region of trunk 202, as shown in FIG. 5. In this configuration, chest panel 126 divides harness 130 into superior segment 131 and lateral segment 132. Superior segment 131 of harness 130 runs over the top of the shoulders of person 200 between back panel 140 and chest panel 126. Lateral segment 132 of harness 130 runs under the shoulders and along the side of trunk 202 between back panel 140 and chest panel 126. In the examples of FIG. 4 and FIG. 5 torso interface 122 comprises a harness 130 configured to at least partially encircle the right shoulder of person 200 and an additional harness 139 configured to at least partially encircle the left shoulder of person 200. This configuration comprises chest panel 126 on harness 130 along the right side of the chest of person 200 and additional chest panel 129 on additional harness 139 along the left side of the chest of person 200. In this configuration, chest panel 126 and additional chest panel 129 are connected with one or more sternum straps 127. Sternum strap 127 may be adjusted in length. Sternum strap 127 may comprise flexible rope, webbing, leather, plastic, or similar material. In some examples, chest panel 129 and additional chest panel 129 are coupled with a zipper, laces, buttons, hook and loop fasteners, or other commonly used textile attachment method. When harness 130 and second harness 139 are present, components of each are equivalent and thus are only labeled once in the figures to avoid overcrowding.

In some examples, harness 130 or second harness 139 is made of webbing but may also comprise cable, rope, twine, or similar material made from textiles or flexible weaves to conform to the shape of person 200. In some examples, harness 130, second harness 139, and/or sternum strap 127 are inextensible to transfer tensile forces, but may have embedded elastic properties to allow minimal stretch to aid in donning/doffing or comfort.

To fit users of various sizes, the torso interface 122 is configured to adjust. For optimal comfort of exoskeleton 100, it is important that the chest panel 126 is properly positioned on the pectoral region of person 200. This requires adjustment in the length of the superior segment 131 and the lateral segment 132. Changes in the height of person 200 may most closely correspond to adjustments in the length of superior segment 131, and changes in the width of person 200 may most closely correspond to adjustments in the length of lateral segment 132. As the height and width of various-sized users do not correspond proportionally between people, the adjustment in length of the superior segment 131 should be independent of the adjustment in length of the lateral segment 132. Adjustment of the superior segment 131 and lateral segment 132 is important so that the chest panel 126 applies the supportive forces and torques generated by the exoskeleton 100 on a comfortable location on the chest of the person 200. Adjustment of harness 130 balances the forces between the superior segment 131 and the lateral segment 132 throughout the bending range of motion of person 200 so that the chest panel 126 stays in the same location on the chest of person 200. The balance of tensile forces between the superior segment 131 and the lateral segment 132 prevents the chest panel 126 from sliding upward-downward or laterally on the chest of the person 200, respectively, which could cause chafing, rubbing, or general discomfort. Proper adjustment of the superior segment 131 and lateral segment 132 also ensures that the supportive forces and torques from exoskeleton 100 are efficiently transferred to the body of person 200 and not lost due to slack or general deformation of torso interface 122.

It is desirable that the means of adjustment of both the superior segment 131 and lateral segment 132 are easy for person 200 to reach when wearing exoskeleton 100 and unobtrusive for all motions of person 200 during normal working or daily activities. An issue arises with the adjustment of lateral segment 132, as means of adjustment located near back panel 140 are difficult to reach, and means of adjustment located near chest panel 126 or along the length of lateral segment 132 often interfere with the arm movement of person 200, such as when resting the arms in a neutral position or reaching across the chest. Therefore, means of adjusting the lateral segment 132 are independent of the superior segment 131 to optimize the effectiveness of the exoskeleton 100 without the issues of usability or comfort.

In the examples shown in FIG. 4 and FIG. 5, the superior segment 131 comprises an adjustment mechanism 135 located above the shoulder of person 200. This is an easy-to-reach location on person 200 and minimally interferes with the common motions of daily or working activities. In some examples, adjustment mechanism 135 is located along superior segment 131 near back panel 140 so that it sits under padding 133 of back panel 140. In the examples of FIG. 4 and FIG. 5, chest panel 126 is configured to slide along the length of the harness 130, allowing for an inversely proportional change in the length of lateral segment 132 and superior segment 131. For example, if chest panel 126 is moved upwardly or inwardly on the chest of person 200, superior segment 131 will shorten and lateral segment 132 will lengthen by the same amount. If chest panel 126 is moved downwardly or outwardly on the chest of person 200, superior segment 131 will lengthen and lateral segment 132 will shorten by the same amount. Sternum strap 127 may then be adjusted accordingly. In this configuration, lateral segment 132 may be adjusted independently of superior segment 131 through the movement of chest panel 126 along the length of harness 130. Thus, only adjustment mechanism 135 of the superior segment 131 is required to fit users of varying combinations of height and width, simplifying the ease of use of exoskeleton 100. The ability of chest panel 126 to slide along harness 130 further serves to balance the tensile forces of superior segment 131 and lateral segment 132 throughout the range of motion of person 200 across the duration of usage of the exoskeleton 100, with the benefits to comfort and effective load transfer previously mentioned. In the examples of FIG. 4, harness 130 has been shortened relative to additional harness 139 while both chest panel 126 and additional chest panel 129 maintain their alignment. Both the superior segment 131 and the lateral segment 132 on harness 130 have been shortened through the adjustment mechanism 135 due to the sliding of the chest panel 126 along harness 130.

To aid in the free sliding along the harness 130, the chest panel 126 may further comprise a routing element 137. Similarly, additional chest panel 129 may comprise additional routing element 134. Routing element 137 is configured to bend harness 130 along a curve between the orientation of superior segment 131 and the orientation of lateral segment 132 such that no tensile forces are transferred through chest panel 126, allowing chest panel 126 to slide freely along harness 130. Depending on the material of harness 130, routing element 137 will define bend radius 237 such that chest panel 126 can freely move along harness 130. Bend radius 237 occurs partially in the frontal, transverse, and sagittal planes 300 of person 200. Routing element 137 may be made of a low-friction material or finish to further aid in the motion of chest panel 126 along the harness, such as plastic, polytetrafluoroethylene (PTFE), or smooth metal. Low-friction properties of the routing element are such that a person 200 of average strength can manually slide chest panel 126 relative to the harness when exoskeleton 100 is fit and tightened to person 200 and person 200 is standing in a neutral posture without having to first loosen straps or components of exoskeleton 100. In some examples, routing element 137 comprises a metal or plastic D-ring, tri-ring, circular ring, rectangular ring, loop, pulley, bent tube, block, or sheave. Chest panel 126 may further comprise chest pocket 191 enclosing routing element 137 and at least a portion of superior segment 131 or lateral segment 132 to hide the components and prevent debris from entering the system. Chest pocket 191 may be lined with a low-friction surface to further aid in motion, such as smooth plastic, smooth metal, or PTFE. In some examples, sternum strap 127 is coupled between routing element 137 of harness 130 and additional routing element 134 of additional harness 139 such that the forces from exoskeleton 100 are efficiently transferred through the material of harness 130, additional harness 139, and sternum strap 127, and no tensile forces are passed through chest panel 126 or additional chest panel 129. This allows for the construction of chest panel 126 or additional chest panel 129 to avoid requiring the transfer of tensile forces and instead focus on the routing of harness 130 and comfortably applying forces to person 200.

Person 200 can don and adjust exoskeleton 100 with torso interface 122 as follows. Person 200 first shoulders exoskeleton 100 using torso interface 122 by sliding both the right and left arms through harness 130 and additional harness 139, respectively. Person 200 can then position and tighten belt 121 on the pelvis and attach first thigh link 104 and second thigh link 106 to thighs 204, 206 of person 200. Sternum strap 127 can then be buckled to connect harness 130 to additional harness 139 or chest panel 126 to additional chest panel 129. Both chest panel 126 and additional chest panel 129 can then be moved to a comfortable position on the chest of person 200, after which sternum strap 127 can be tightened. Finally, the adjustment mechanism 135 on the superior segment 131 of the harness 130 and the additional harness 139 is tightened, which simultaneously tightens the lateral segment 132. One of the skills in the art may recognize that these steps may be done in various orders, such as tightening the adjustment mechanism 135 before the sternum strap 127 or attaching of torso interface 122 before the belt 121. While using exoskeleton 100, person 200 can easily adjust the location of chest panel 126 by grabbing chest panel 126 and sliding it upwards or downwards along harness 130. This allows for quick tuning of the fit of exoskeleton 100 to optimize the comfort of person 200 throughout the day. Chest panel 126 may be adjusted in this manner without adjusting sternum strap 127 or adjustment mechanism 135. Person 200 may also loosen or tighten sternum strap 127 or adjustment mechanism 135 to facilitate the ease of movement or proper positioning of chest panel 126.

In some examples, torso interface 122 may comprise means for preventing chest panel 126 from freely sliding along harness 130. This may be required for some motions of body shapes of person 200 that may cause chest panel 126 to drift along harness 130 over time. Torso interface 122 may further comprise a limiting element 124 configured to prevent chest panel 126 from sliding relative to harness 130 after torso interface 122 has been adjusted to the size of person 200. In some examples, limiting element 124 may comprise a clamping mechanism attached to or integrated with chest panel 126 or routing element 137. In an unlocked state, limiting element 124 does not prevent chest panel 126 from moving along harness 130. This may correspond to when torso interface 122 is being adjusted to fit person 200 or when person 200 is using exoskeleton 100. In a locked state, limiting element 124 prevents chest panel 126 from moving along harness 130 in at least one direction. This may correspond when person 200 is using exoskeleton 100 and wants to prevent the drift of chest panel 126. Limiting element 124 may consist of a cam lock, ladder lock, cleat, clutch, ratcheting pulley, or other mechanism that locks in only one direction. In some examples, limiting element 124 prevents chest panel 126 from moving along harness 130 only in a direction that corresponds to shortening of superior segment 131 and lengthening of lateral segment 132. In other examples, limiting element 124 prevents chest panel 126 from moving along harness 130 only in a direction that corresponds to lengthening of superior segment 131 and shortening of lateral segment 132. Still, in other examples, limiting element 124 prevents chest panel 126 from moving along harness 130 in any direction, such as with a clamp, hook and loop, peg and hole, or other fastener. In some examples, the function of limiting element 124 is integrated into routing element 137.

Figure 6:
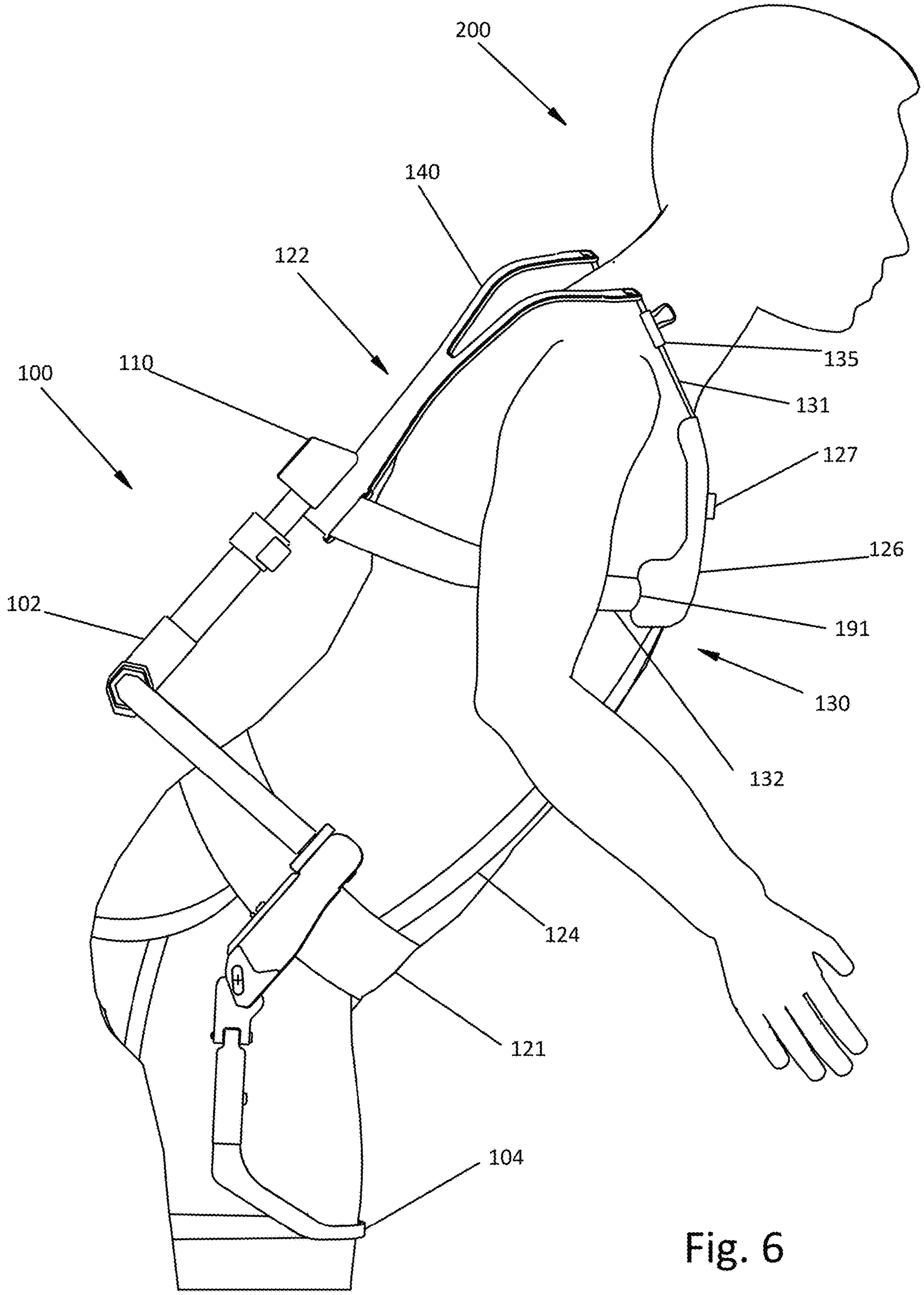
FIG. 6 depicts a side view of the torso interface on a person, in accordance with some examples.

FIG. 6 shows a side view of an example of torso interface 122 wherein limiting element 124 comprises a suspender strap. In this embodiment, limiting element 124 is configured to couple chest panel 126 to belt 121 along the front of person 200. Limiting element 124 may prevent chest panel 126 from rising on the chest of person 200, in a direction that corresponds to shortening of superior segment 131 and lengthening of lateral segment 132. Limiting element 124 may also help to prevent belt 121 from falling down over the hips of person 200. In some examples, limiting element 124 is inextensible. In other examples, limiting element 124 is elastic to aid in the comfort or motion of person 200. Limiting element 124 may adjust in length to fit people having various sizes or to position the chest panel 126 at different levels on the chest of a person 200. Limiting element 124 may be quickly attached and detached from chest panel 126 or belt 121 by means of hook and loop fasteners, clips, buckles, snaps, or other methods used by one skilled in the art.

Figure 7:
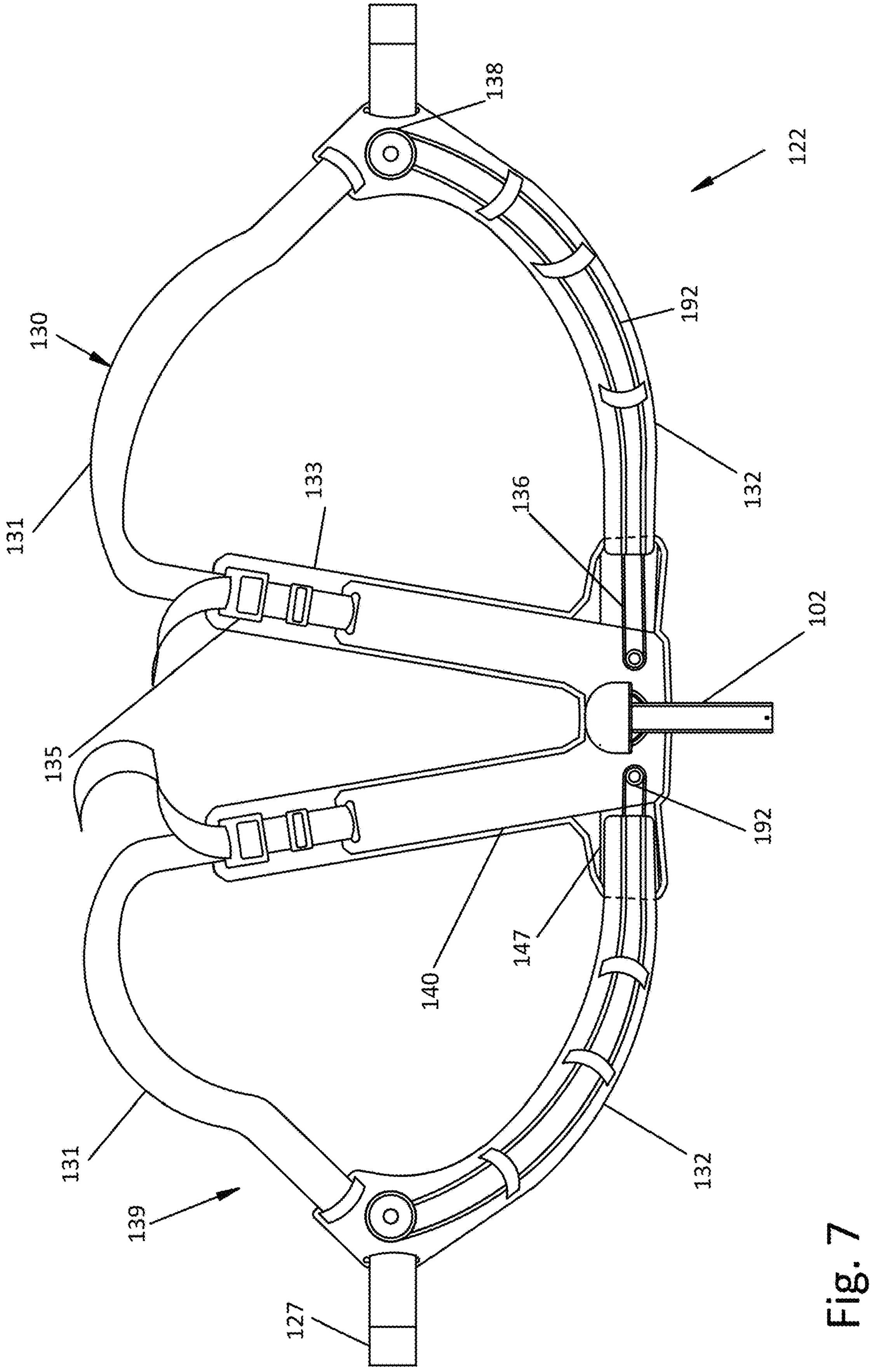
FIG. 7 depicts a torso interface, in accordance with some examples.

FIG. 7 shows an alternate example of a torso interface 122. In this example, lateral segment 132 conforms to both the chest and sides of trunk 202 of person 200 with a flat, flexible, and inelastic structure. Furthermore, in this example, lateral segment 132 may comprise a combination of flat layers of fabric, plastic, foam, mesh, carbon fiber, or metal. Superior segment 131 runs over the top of the shoulder of person 200, connecting back panel 140 to the front side of lateral segment 132. Superior segment 131 comprises an adjustment mechanism 135 that adjusts the length of superior segment 131 but not the length of lateral segment 132. Instead, lateral segment 132 is configured to move relative to back panel 140 behind the body of person 200. Back panel 140 may comprise back pocket 147 configured to enclose a portion of lateral segment 132 to define its range of motion. Back pocket 147 may be lined with low-friction material such as smooth plastic or metal. In other examples, a plastic guide rail or a metal guide rail may be used to provide smooth motion between the lateral segment 132 and back panel 140. Lateral segment 132 is coupled to back panel 140 with connection element 136. Connection element comprises a flexible piece of rope, cable, twine, chain, webbing, chord, or other material. At its first end, connection element 136 is coupled to back panel 140. Connection element 136 is then routed through the back, side, and front of lateral segment 132 through one or a series of connection routing elements 192. In this embodiment, connection routing element 192 may be used to define the position of connection element 136 and reduce friction. Connection routing element 192 may comprise low-friction tubing, Bowden tubing, pulleys, rounded edges, drums, etc. The second end of connection element 136 is coupled to or routed through remote adjustment 138 coupled to the front side of lateral segment 132 along the chest of person 200 so that it is easy to reach. Remote adjustment 138 is configured to tighten, loosen, or fix the length of connection element 136 to adjust the position of lateral segment 132 relative to back panel 140. In this embodiment, lateral segment 132 is configured to slide horizontally with respect to back panel 140 to correspond to an adjustment in the width or depth of trunk 202. Torso interface 122 further comprises at least one sternum strap 127 to connect lateral segment 132 of harness 130 on the right side of the person to lateral segment 132 of additional harness 139 on the left side of the person 200. To more comfortably sit on the sides and chest of person 200, lateral segment 132 may be shaped into the structure shown in FIG. 7, with: a straight horizontal portion that facilitates adjustment with back panel 140, a middle u-shaped dip to sit along the side of the ribcage of person 200 without digging into the arm pit, and a front S-curved portion to sit on the pectoral muscle of person 200 that dodges the clavicle and breast region. In the embodiment of FIG. 7 additional harness 139 has been made smaller relative to harness 130 by means of remote adjustment 138 to shorten lateral segment 132 and adjustment mechanism 135 to shorten superior segment 131. A coupling segment of connection element 136 refers to a length of connection element 136 routed between components, such that when a tensile force is applied to connection element 136, the components are moved relative to each other. In a primary embodiment, the coupling segment of connection element 136 makes the size of torso interface 122 smaller by applying a force between two components of torso interface 122. An adjustment segment of connection element 136 refers to a portion of connection element 136 that is forcibly moved by remote adjustment 138, which creates tensile forces in connection element 136 that are used by the coupling segment of connection element 136.

In the embodiment of FIG. 7, remote adjustment 138 comprises a ratcheting wheel that winds up connection element 136, consisting of a thin steel cable. Connection routing element 192 consists of a low-friction plastic tube that envelops connection element 136 along the length of lateral segment 132. Connection element 136 is laced between back panel 140 and lateral segment 132 to achieve the needed adjustment range and mechanical advantage. Remote adjustment 138 is configured to ratchet in a first rotation direction as connection element 136 is shortened. Remote adjustment 138 can then allow the connection element to be freely loosened when rotated in a second rotational direction or pushed/pulled in a first linear direction. Remote adjustment 138 allows person 200 to easily adjust the length of lateral segment 132 without obstructing the movement of person 200, unlike prior art, which requires an adjustment mechanism along the side or back of lateral segment 132 where it slides relative to back panel 140. Sternum strap 127 may be configured to slide along the length of lateral segment 132 to adjust the height at which sternum strap 127 sits across the chest of person 200. In some examples, a similar connection element 136 and remote adjustment 138 may be used to adjust the length of the superior segment 131.

Figure 8:
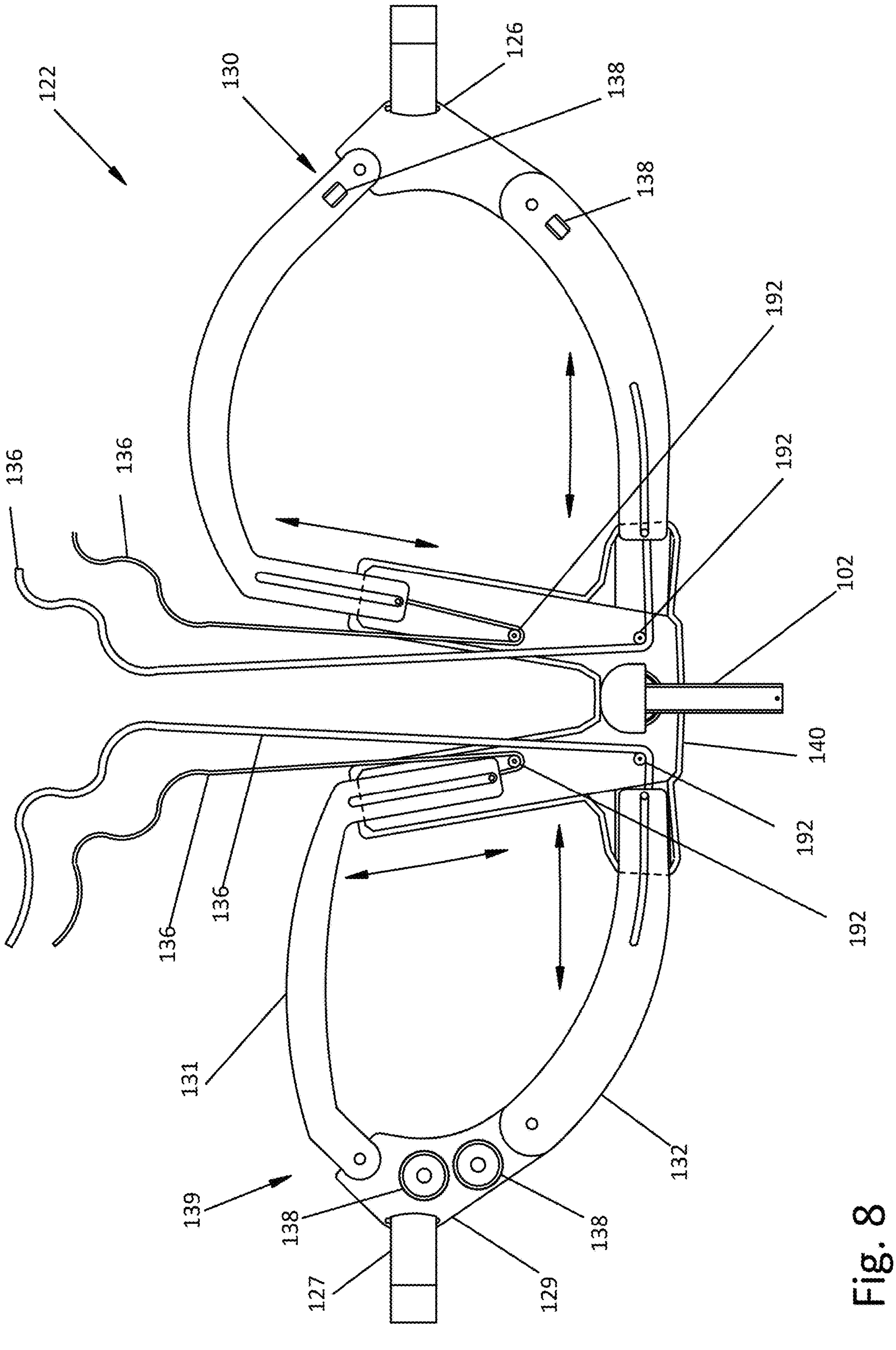
FIG. 8 depicts a torso interface, in accordance with some examples.

FIG. 8 shows an alternate embodiment of torso interface 122. In this example, lateral segment 132 and/or superior segment 131 are made of a flat, flexible, and inextensible material such as plastic, carbon fiber, metal, or textiles. Superior segment 131 is coupled to chest panel 126 from its first end with a rotational degree of freedom, coupled to back panel 140 from its second end with a rotational and linear degree of freedom. Lateral segment 132 is likewise coupled to chest panel 126 from its first end with a rotational degree of freedom, coupled to back panel 140 from its second end with a rotational and or linear degree of freedom. In some examples, a linear degree of freedom is created with a pocket or rail between the two components. Lateral segment 132 or superior segment 131 may contain a slot to guide and constrain the linear degree of freedom with the back panel 140. The rotational degrees of freedom between the back panel 140, superior segment 131, lateral segment 132, and chest panel 126 allow for the torso interface 122 to closely conform to the trunk 202. Rotational degrees of freedom may be created with rivets, screws, posts, buttons, or other means.

In the embodiment of FIG. 8 torso interface 122 further comprises a connection element coupled to the second end of lateral segment 132 that couples to back panel 140 to adjust the location of lateral segment 132 along its linear degree of freedom with back panel 140. Connection element 136 may comprise a rope, cable, webbing, chord, twine, bungee, or similar flexible material. Connection element 136 may be rigid or elastic. In a primary embodiment connection element 136 is inelastic and transfers tensile forces without a change in length. Connection element 136 is routed behind back panel 140 and over superior segment 131 or along lateral segment 132. In some examples, connection element 136 is routed to chest panel 126. Connection element 136 passes through or terminates at remote adjustment 138 coupled to superior segment 131 or chest panel 126 or lateral segment 132 in a position that is easy for person 200 to reach. Remote adjustment 138 may comprise a ratcheting wheel as in FIG. 7 or other mechanism, such as a cleat or clutch. Remote adjustment 138 may be manually locking or self-locking. In FIG. 8, additional harness 139 utilizes two ratcheting wheel remote adjustments 138 located on chest panel 126, and harness 130 utilizes a clutch remote adjustment 138 located near the front of superior segment 131 and lateral segment 132. Many combinations of terminations at remote adjustment 138 located on the superior segment 131, lateral segment 132, or chest panel 126 are possible, as can be understood by one skilled in the art. Connection element 136 may pass through one or multiple routing elements 137 coupled to one or a combination of back panel 140, superior segment 131, and chest panel 126. In the example of FIG. 8, the second connection element 136 may be used to adjust the linear degree of freedom of the superior segment 131 along the back panel 140. Connection element 136 is coupled to the second end of superior segment 131 that couples to back panel 140 to adjust the location of superior segment 131 along its linear degree of freedom with back panel 140. Connection element 136 may be routed behind back panel 140 and along lateral segment 132. In some examples, connection element 136 is routed to chest panel 126. Connection element 136 passes through or terminates at remote adjustment 138 coupled to lateral segment 132 or chest panel 126. Connection element 136 may pass through one or multiple connection routing elements 192 coupled to one or a combination of back panel 140, lateral segment 132, and chest panel 126. Thus, in the example of FIG. 8, the length of the superior segment 131 or lateral segment 132 may be easily adjusted through remote adjustment 138 located at the front of trunk 202 on or near chest panel 126. Means to organize any loose ends or tails of connection element 136 may be used to prevent snag hazards. In the embodiment of FIG. 8 additional harness 139 has been made smaller than the harness 130 through remote adjustment 138 of both the superior segment 131 and lateral segment 132. In FIG. 8 additional harness 139 has been made smaller than harness 130 by means of the connection element 136 on both the superior segment 131 and lateral segment 132.

In some examples, connection element 136 may couple both the second end of lateral segment 132 to back panel 140 and the second end of superior segment 131 to back panel 140. In this example, the adjustment of connection element 136 via remote adjustment 138 alters the effective length of both superior segment 131 and lateral segment 132. It also allows for the repositioning of chest panel 126, like the embodiment of FIG. 4, as the length of superior segment 131 can shorten with a proportional increase in the length of lateral segment 132 and vice versa.

In some examples, chest panel 126 may integrate superior segment 131 into a single component made of materials previously described. This removes the rotational degree of freedom between chest panel 126 and superior segment 131, but preserves the adjustability as described in FIG. 8. Chest panel 126 may also integrate lateral segment 132 into a single component. This removes the rotational degree of freedom between chest panel 126 and lateral segment 132, but preserves the adjustability as described in FIG. 8. In this example, chest panel 126 integrates the function of both lateral segment 132 and superior segment 131. Chest panel 126 is made of a flat, flexible, and inextensible material such as plastic, carbon fiber, metal, or textiles. Chest panel 126 is contoured to apply a supportive force onto the chest of person 200 and contour above the shoulders to connect to back panel 140 from its superior end at a rotational and linear degree of freedom and along the side of the trunk to connect to back panel 140 from its lateral end, also at a rotational and linear degree of freedom. First connection element 136 is coupled between the superior end of chest panel 126 and back panel 140 from its first end and routed to remote adjustment 138 located near the front of chest panel 126 from its second end. A second connection element 136 is coupled between the lateral end of chest panel 126 and back panel 140 at its first end and routed to remote adjustment 138 located near the front of chest panel 126 from its second end. Thus, like the embodiment of FIG. 8, the length of the superior end of chest panel 126 or the lateral end of chest panel 126 may be easily adjusted relative to back panel 140 through remote adjustment 138 located at the front of the trunk 202 on or near chest panel 126. Compared to the embodiment of FIG. 8, this embodiment is simpler, but potentially less comfortable due to the reduction in flexibility.

In some examples, connection element 136 may couple both the lateral end of chest panel 126 to back panel 140 and the superior end of chest panel 126 to back panel 140. In this example, the adjustment of connection element 136 via remote adjustment 138 alters the effective length of both the superior end and lateral end of chest panel 126. It also allows for the repositioning of chest panel 126, like the embodiment of FIG. 4, as the length of the superior end can shorten with a proportional increase in the length of the lateral end and vice versa.

The embodiments of FIG. 8 or any other described may further comprise a spring between back panel 140 and superior segment 131 or between back panel 140 and lateral segment 132 configured to bias torso interface 122 into a smaller position such that it automatically shrinks to fit the torso.

In some examples, the torso interface 122 may comprise padding 133 attached to the back panel 140, chest panel 126, superior segment 131, or lateral segment 132 to increase the comfort of the person 200. Padding 133 may be attached via hook and loop fasteners, buttons, snaps, buckles, or direct stitching. Padding 133 may form a sleeve around the superior segment 131 or lateral segment 132 to not obstruct length adjustments. Padding 133 may comprise foam, mesh, or similar materials that are either solid or ventilated.

In some examples, torso interface 122 comprises a single harness 130 configured to horizontally wrap around the trunk 202 of the person under the armpits. Harness 130 may be split into two halves that are attached or detached along the front of the trunk 202. One or both halves of harness 130 may comprise remote adjustment 138 to adjust the length of harness 130 to fit a different-sized person 200.

In some examples, torso frame 102 or other structure component of exoskeleton 100 may be adjusted in size through a similar method using remote adjustment 138. In some examples, torso frame 102, thigh link 104, or other structural component of exoskeleton 100 is made of a telescoping, sliding, hinged, or generally movable structure. This may include structures corresponding to the height, width, or depth of person 200, including but not limited to torso height, torso width, torso depth, leg length, arm length, etc., but the below description will use only torso frame 102 for brevity. Exoskeleton 100 further comprises a connection element 136 between at least two moveable elements of torso frame 102. One or more connection routing elements 192 may be used to reduce bend radii or friction forces on the connection element 136. Connection element 136 may comprise rope, wire, chain, belts, webbing, or similar flexible material, and connection routing element 192 may comprise rounded edges, pulleys, drums, etc. Remote adjustment 138 is configured to shorten or lengthen connection element 136, which provides a force to make torso frame 102 smaller or larger on person 200. In some examples, the torso frame 102 is configured to shorten or elongate behind the trunk or person 200 corresponding to a torso height. As this is a difficult place for person 200 to reach while wearing exoskeleton 100, remote adjustment 138 may be placed along the front or side of person 200 and coupled to the adjustment of torso frame 102 behind the back of person 200. Remote adjustment 138 may comprise a ratcheting wheel, pull chord, toggle lever, push/pull cable, or other mechanism.

In some examples, adjusting the back panel 140 of the torso interface 122 is performed to optimize the direction of tensile forces along the superior segment 131 and lateral segment 132. Superior segment 131 and lateral segment 132 are flexible and act to transfer tensile forces to apply the supporting torque of exoskeleton 100 to trunk 202. If the mounting position of either the superior segment 131 or lateral segment 132 and back panel 140 is smaller than the profile of trunk 202 (i.e., narrower than the width of the trunk 202, or shorter than the top of the person's shoulder), it may cause the torso interface 122 to uncomfortably squeeze the person 200. If the mounting position of either superior segment 131 or lateral segment and back panel 140 is larger than trunk 202 (i.e. wider than the width of trunk 202 or taller than the top of person's shoulder), a gap will be formed between torso interface 122 and person 200 which can make torso interface 122 less comfortable or create environmental hazards such as snagging in confined spaces. Thus, for optimal fit of upper torso interface 122, the mounting between superior segment 131 and back panel 140 or lateral segment 132 and back panel 140 should be located substantially along the outer profile 260 of the person's trunk 202, meaning such that they minimize squeezing of person 200 or unnecessarily extending beyond outer profile 260 to the extent torso interface 122 interferes with the environment or the motion of person 200. As exoskeleton 100 is configured to create a supportive torque in sagittal plane 300 of person 200, outer profile 260 is defined as the profile of person's trunk in the frontal plane 310 of person, as shown in FIG. 3. In some examples, superior segment 131 mounts to back panel 140 substantially along outer profile 260 of person's trunk between the shoulder and neck of person 200 and lateral segment 132 mounts to back panel 140 substantially along outer profile 260 of person's trunk between the armpit and the waist of person 200. In some examples, back panel 140 is substantially rigid such that neither the superior segment 131 nor the lateral segment 132 squeezes person 200 near back panel 140 when tensile forces are transferred through harness 130. Due to the relative flexibility of textile chest panel 126 relative to back panel 140, some squeezing of person 200 may occur along the front of the person near the chest panel, however back panel 140 is configured to minimize squeezing of the back of the person near the back panel 140, such as the area of the trapezius of person 200 or over the top of the shoulders of person 200. As there are many variations in width and height among the population, it is also desirable for the back panel 140 to adjust such that its mounting location to the lateral segment 132 and superior segment 131 can vary relative to the person's trunk 202. These adjustments should be as simple for person 200 to use and allow for the most detailed increment of movement possible. The below-described back panel 140 allows for the torso interface 122 to automatically adjust to the person 200.

Figure 9A:
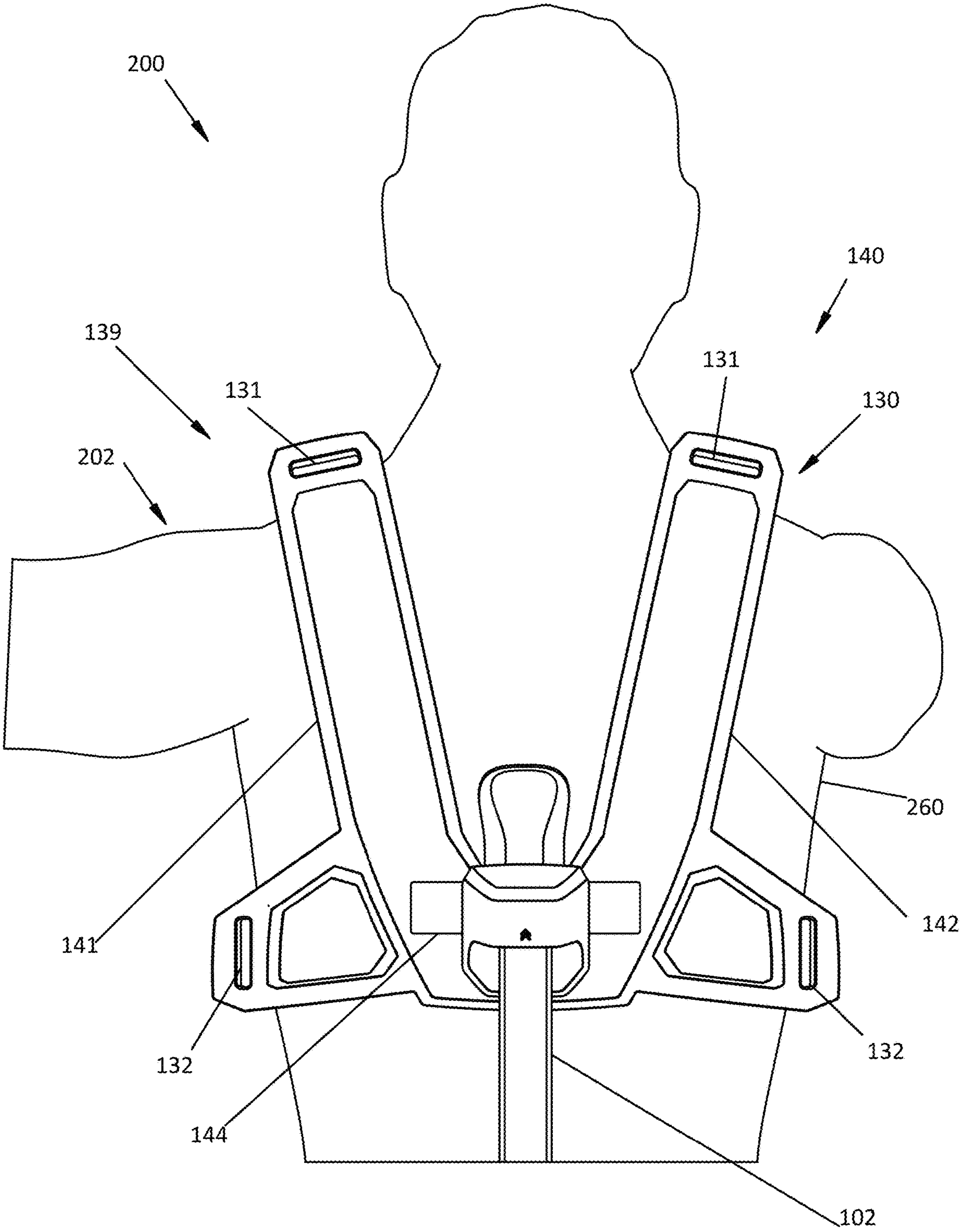
FIGS. 9A and 9B depict a horizontal adjustment of the back panel of the torso interface, in accordance with some examples.
Figure 9B:
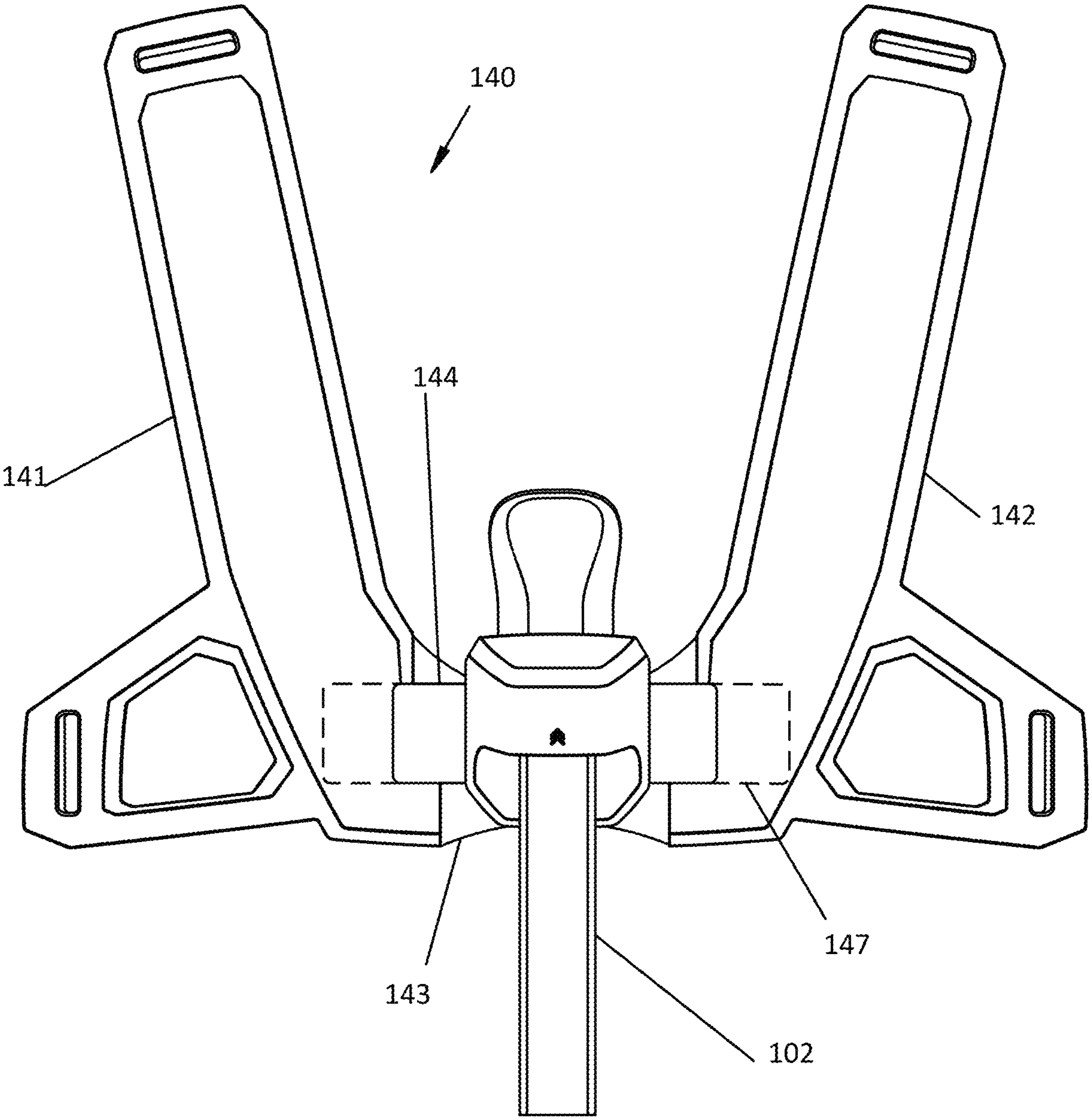

FIGS. 9A and 9B show an example of torso interface 122 where back panel 140 is configured to automatically adjust torso interface 122 to the width of the trunk 202. Back panel 140 further comprises central panel 144 coupled to torso frame 102 near the middle of trunk 202, first panel 141 moveably coupled to central panel 144 on the right side of trunk 202, second panel 142 moveably coupled to central panel 144 on the left side of trunk 202, and spring 143 configured to bias second panel 142 towards first panel 141. In the example of FIGS. 9A and 9B, first panel 141 and second panel 142 are configured to move in a horizontal direction relative to central panel 144, orthogonal to the spine of person 200, and orthogonal to the supporting force 230 applied by upper torso interface 122 to trunk 202. Torso interface 122 further comprises harness 130 coupled to first panel 141 and configured to at least partially encircle a right side of trunk 202, and additional harness 139 coupled to second panel 142 and configured to at least partially encircle a left side of trunk 202. In the embodiment shown in FIGS. 9A and 9B, harness 130 is configured to at least partially encircle the right shoulder of person 200, and additional harness 139 is configured to at least partially encircle the left shoulder of person 200. Both harness 130 and additional harness 139 are equivalent to harness 130, further comprising one or a combination of superior segment 131, lateral segment 132, and chest panel 126. In this example, harness 130 may be coupled to additional harness 139 with at least one sternum strap 127. In some examples, additional harness 139 and harness 130 may be two halves of a chest strap configured to run horizontally around trunk 202.

Figure 10A:
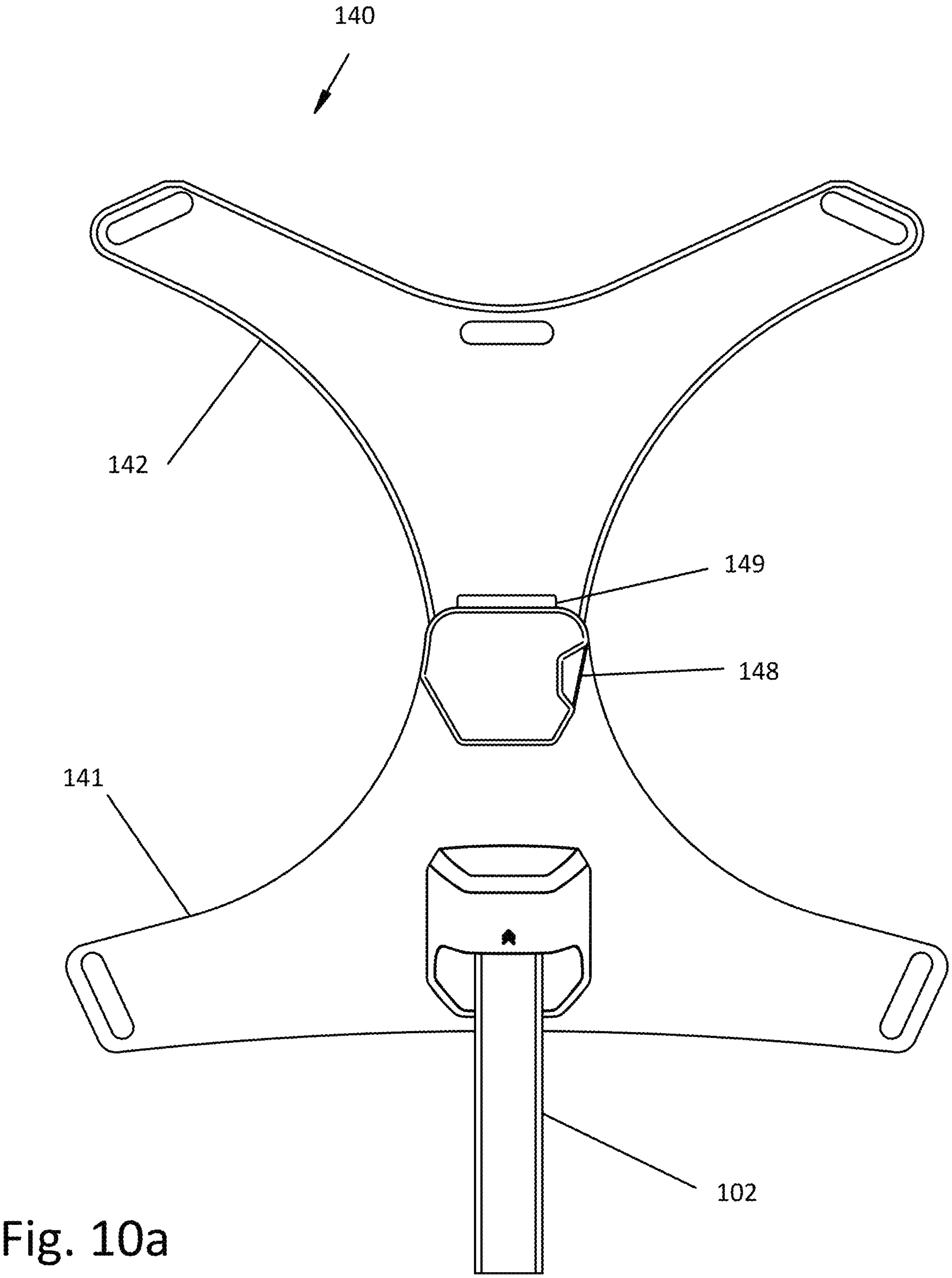
FIGS. 10A and 10B depict a vertical adjustment of the back panel of the torso interface, in accordance with some examples.
Figure 10B:
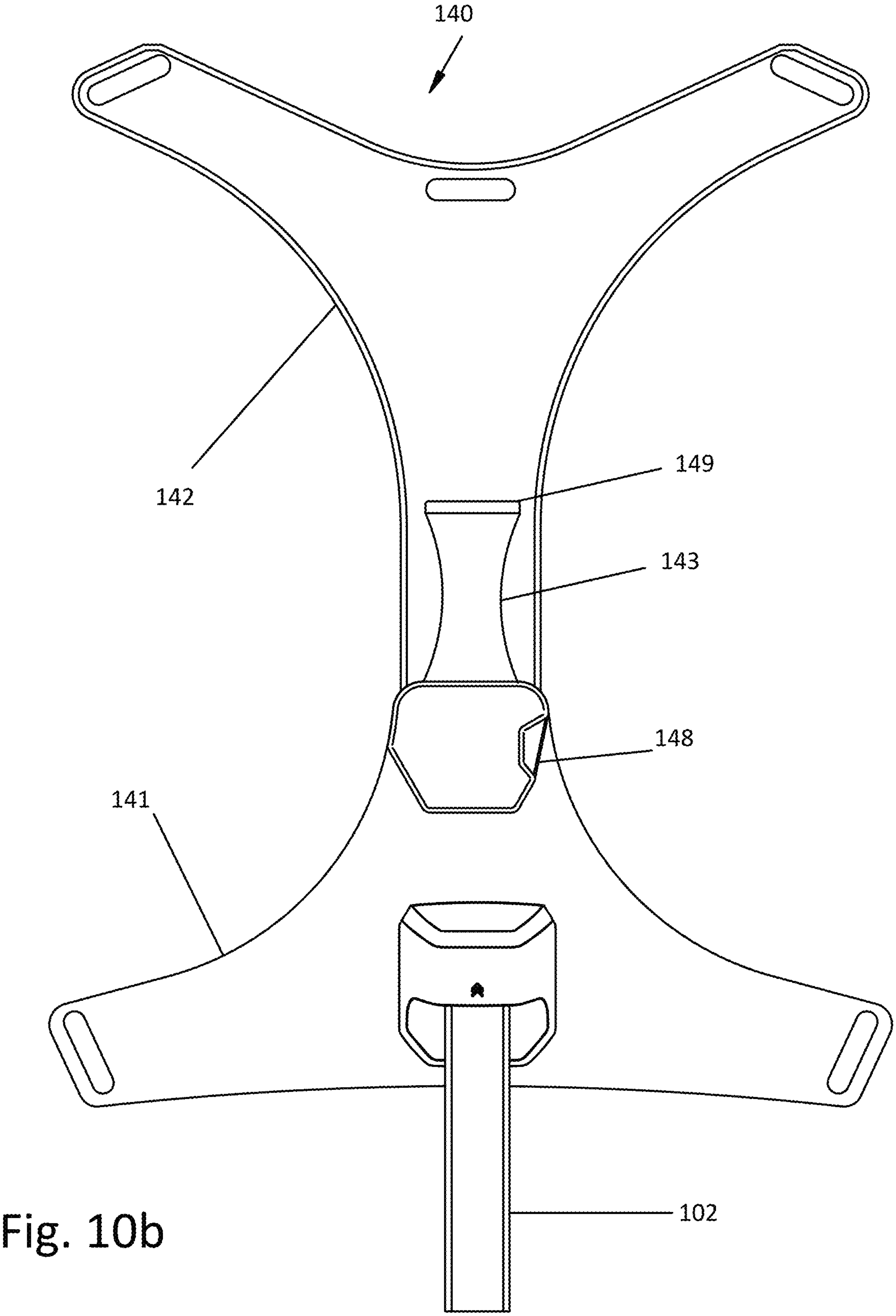

FIGS. 10A and 10B show an embodiment of torso interface 122 where back panel 140 is configured to automatically adjust torso interface 122 to the height of trunk 202. Back panel 140 further comprises central panel 144 coupled to torso frame 102 near the middle of trunk 202, first panel 141 moveably coupled to central panel 144, and spring 143 configured to bias first panel 141 towards central panel 144. In the example of FIGS. 10A and 10B, first panel 141 is configured to move in a vertical direction relative to central panel 144, parallel to the spine of person 200 and orthogonal to the supporting force 230 applied by upper torso interface 122 to trunk 202. Torso interface 122 further comprises harness 130, coupled to first panel 141 from its first end and to central panel 144 from its second end, harness 130 being configured to at least partially encircle trunk 202. In the embodiment shown in FIGS. 10A and 10B, torso interface 122 comprises harness 130 coupled to first panel 141 along superior segment 131 close to the top of the shoulder of person 200 and coupled to central panel 144 along lateral segment 132 close to the side of the torso under the arm. Torso interface 122 further comprises second panel 142 coupled to first panel 141 along superior segment 131 close to the top of the shoulder of person 200 and coupled to central panel 144 along lateral segment 132 close to the side of the torso. In this example, harness 130 may be coupled to additional harness 139 with at least one sternum strap 127.

When the exoskeleton 100 is worn by person 200, forces from spring 143 balance with reaction forces between person 200 and harness 130 such that the mounting location between harness 130 and back panel 140 is roughly equivalent to outer profile 260 of trunk 202 in frontal plane 310. Reaction forces between person 200 and harness 130 are felt as a squeeze on person 200, either laterally on trunk 202 under the armpits or downward on the shoulders of person 200. Reaction forces are due to the tightening of the upper torso interface 122 or from the transfer of tensile forces derived from the supportive torque produced by the exoskeleton 100.

In the example of FIGS. 9A and 9B, outer profile 260 of person 200 corresponds to the width of trunk 202, and in the example of FIGS. 10A and 10B, outer profile 260 of person 200 corresponds to the height of trunk 202. When the mounting location between harness 130 and back panel 140 is outside of outer profile 260 of person 200 (wider or taller than person 200), forces from spring 143 cause second panel 142 and/or first panel 141 to move towards central panel 144 without resistance from reaction forces between person 200 and upper torso interface 122. This makes the torso interface 122 smaller on a person 200. When the mounting location between harness 130 and back panel 140 is inside outer profile 260 (narrower or shorter than person 200), forces from spring 153 cause second panel 142 and/or first panel 141 to move towards central panel 144 with resistance from reaction forces between person 200 and torso interface 122. If reaction forces between person 200 and torso interface 122 are greater than forces from spring 143, first panel 141 and or second panel will move away from central panel 144. This makes torso interface 122 larger on person 200. In this manner upper torso interface 122 can automatically adjust to fit the trunk 202. The forces from spring 143 can be designed to be the minimum value such that it causes the first panel 141 or second panel 142 to move towards the central panel 144. This value may be just more than what is required to overcome friction in the motion of the back panel 140. A minimum value in force of spring 143 allows for the mounting location between harness 130 and back panel 140 to sit as close to the outer profile 260 of trunk 202 as possible in the frontal plane 310. Larger forces of spring 143 may be utilized for quicker actuation of back panel 140 or to create a certain amount of reaction force, or squeeze, that may be deemed comfortable by person 200. Larger forces of spring 143 will cause a greater difference between the mounting location between harness 130 and back panel 140, and outer profile 260, where the mounting location between harness 130 and back panel 140 is smaller than the person's outer profile 260. Depending on the comfort of the person 200 to reaction forces, roughly equivalent, may mean within a few inches. In some embodiments, the force created by spring 143 is adjustable. In some examples, when exoskeleton 100 is worn by person 200, reaction forces from upper torso interface 122 balance with forces from spring 143 such that second panel 142 is positioned relative to first panel 141 in a way that minimizes both the profile of back panel 140 on person 200 and reaction forces from upper torso interface 122 that squeeze person 200.

In use, the embodiment of FIGS. 9A and 9B and FIGS. 10A and 10B will default to the smallest size of back panel 140 and thus upper torso interface 122 when not worn by person 200 due to forces from spring 143. When person 200 picks up exoskeleton 100 from harness 130, reaction forces on harness 130 from the weight of exoskeleton 100 may overcome forces from spring 143 to increase the size of upper torso interface 122. This allows person 200 to more easily don torso interface 122. Once person 200 has partially donned exoskeleton 100 without torso interface 122 being tightened, i.e., harness 130 is loose, back panel 140 may again move to a smaller than optimal position due to forces from spring 143. When the harness 130 or upper torso interface 122 is tightened, reaction forces are created that cause the back panel 140 to enlarge. Back panel 140 thus enlarges until reaction forces from upper torso interface 122 lessen to balance with forces from spring 143. Force of spring 143 is designed such that the balance of reaction forces from upper torso interface 122 and person 200 when standing upright occurs when the mounting location between harness 130 and back panel 140 is roughly aligned with the outer profile 260. When wearing upper torso interface 122, the breathing of person 200 may correspond to a proportional change in the size of back panel 140 due to the rhythmic change in the size of the trunk due to expansion and contraction of the lungs. When person 200 bends and receives supportive force 230 from exoskeleton 100, reaction forces between person 200 and upper torso interface 122 due to supportive force 230 may also change the size of back panel 140. Due to forces of spring 143, the mounting location between harness 130 and back panel 140 will always be slightly narrower than outer profile 260 when person 200 is standing in a neutral upright posture, such that a minimal reaction force is created. When supportive force 230 is added to the system, the reaction force will increase, and thus the size of back panel 140 will increase. In these ways, back panel 140, and thus upper torso interface 122 and exoskeleton 100, can dynamically adjust in size to maximize the comfort of person 200 based on a combination of their stature, breathing, and motion, as well as the fit and support of exoskeleton 100. In some examples, the forces from spring 143 are reversed to bias the torso interface 122 into its largest setting to allow for easier donning and doffing of the exoskeleton 100. The adjustable panels of the back panel 140 may lock into discrete settings or clamp together to lock in the size of the torso interface 122 when the exoskeleton 100 is worn by a person 200. Back panel 140 may also comprise a hard stop configured to limit the minimum size setting of torso interface 122 as biased by spring 143.

Figure 11:
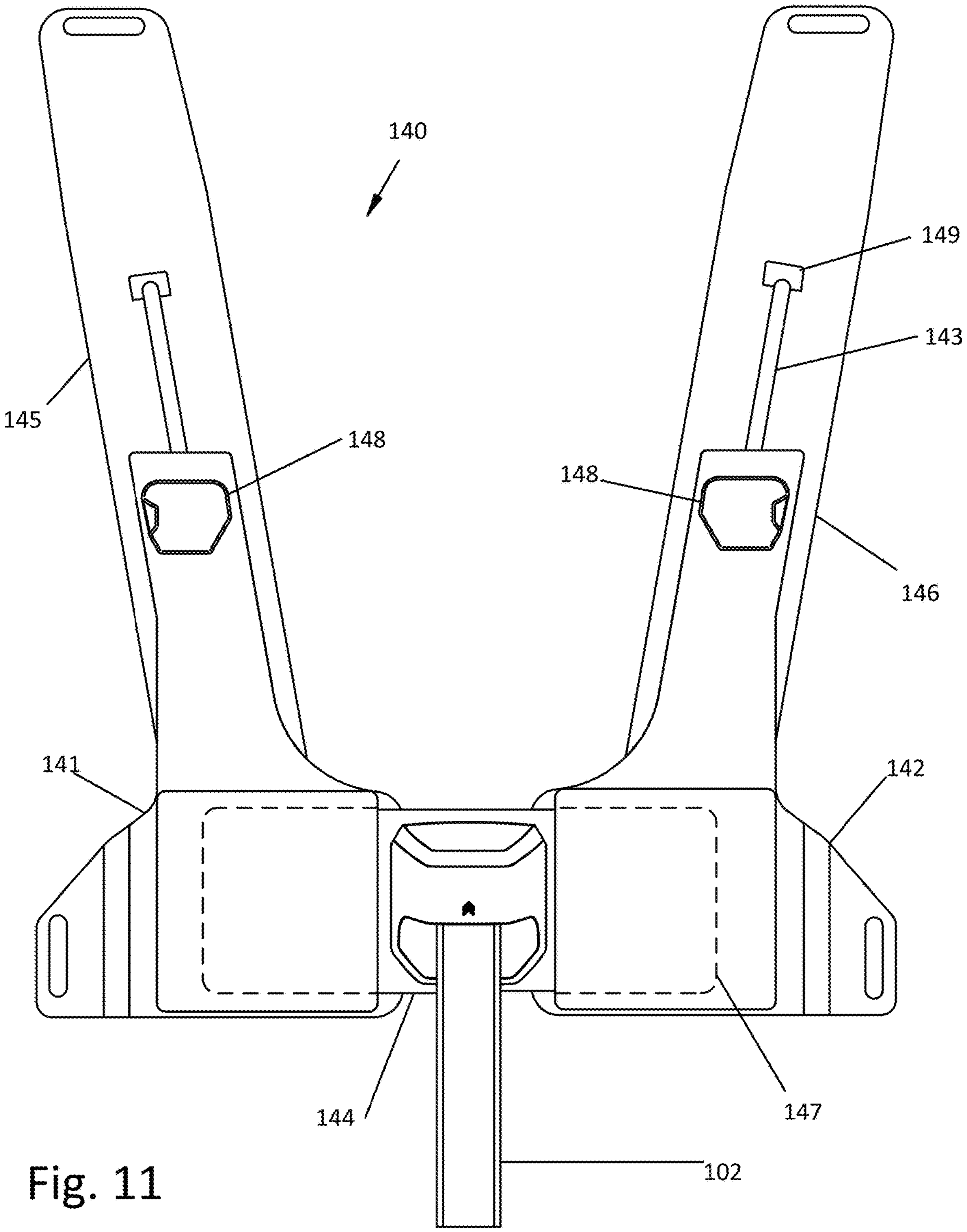
FIG. 11 depicts a horizontal and vertical adjustment of the back panel of the torso interface, in accordance with some examples.

One of the skills in the art may recognize that the embodiments of FIGS. 9A and 9B and FIGS. 10A and 10B may be combined to create an upper torso interface 122 that dynamically adjusts to both the width and height of person 200. In some examples, back panel 140 comprises first panel 141 and second panel 142 configured to move in a horizontal direction relative to central panel 144, and third panel 145 configured to move in a vertical direction relative to central panel 144. The embodiment of FIG. 11 is configured to adjust the vertical distance between the superior segment 131 and the lateral segment 132 of both the harness 130 and the additional harness 139. However, this embodiment is configured to only adjust the horizontal distance between lateral segment 132 of harness 130 and the lateral segment of additional harness 139. In this example, back panel 140 may comprise one spring 143 configured to bias first panel 141, second panel 142, and third panel 145 towards central panel 144 or multiple springs 143 to act on each or a combination of panels.

In an example shown in FIG. 11, the back panel 140 comprises first panel 141 and second panel 142 configured to move in a horizontal direction relative to central panel 144, and third panel 145 and fourth panel 146 configured to move in a vertical direction relative to central panel 144. The embodiment of FIG. 11 is configured to adjust the vertical distance between the superior segment 131 and the lateral segment 132 of both the harness 130 and the additional harness 139. Additionally, the embodiment of FIG. 11 is configured to adjust the horizontal distance between lateral segment 132 of harness 130 and lateral segment 132 of additional harness 139, and between superior segment 131 of harness 130 and lateral segment 132 of additional harness 139. In this embodiment, only the first panel 141 and the second panel 142 can be slidably coupled to the central panel 144, and the third panel 145 is slidably coupled to the first panel 141, and the fourth panel 146 is slidably coupled to the second panel 142. A series of spring 143 bias torso interface 122 into its smallest position among these degrees of freedom. Alternatively, first panel 141, second panel 142, third panel 145, and fourth panel 146 may all be slidably coupled to central panel 144. In this example, the back panel 140 may comprise one spring 143 configured to bias the first panel 141, second panel 142, third panel 145, and fourth panel 146 towards the central panel 144, or multiple springs 143 to act on each or a combination of panels. In some examples, back panel 140 forms a general "U" shape such that the center of the back of person 200 is open for the D-ring of a safety harness.

Central panel 144, first panel 141, second panel 142, and other panels are made of aluminum, steel, carbon fiber, plastic, or similar material. In some examples, any of the panels may be made structured such that they are rigid at one end and flexible at another. For example, first panel 141 or second panel 142 may be rigid where they connect to central panel 144 to allow for smooth motion, but flexible where they connect to harness 130 to help back panel 140 conform to trunk 202. In some examples, the first panel 141 or second panel 142 is made of layered materials such that they are substantially rigid at their proximal end and flexible or resilient at their distal end. In other examples, the first panel 141 and the second panel 142 are made of two separate materials joined together. In further examples, the first panel 141 and the second panel 142 are configured to connect to the lateral segment 132 of harness 130 and are made of a rigid material, while the third panel 145 and or fourth panel 146, configured to connect to the superior segment 132, are made of a semi-flexible or resilient material. When adjusting in a vertical direction on person 200, the flexibility of a panel may allow for the back panel 140 to more closely conform to the round of a person's back. Motion between panels may be achieved through linear bearings, rails, slotted plates, pockets, or any other linear motion mechanism known by those skilled in the art.

In some examples, the rigid frame components of exoskeleton 100, such as torso frame 102 or thigh link 104, may similarly be configured to automatically adjust in size on person 200. Torso frame 102 or thigh link 104 may comprise multiple sub-components or panels configured to move, translate, or rotate relative to each other and biased into the smallest configuration by spring 143. When person 200 puts on exoskeleton 100, components of exoskeleton 100 will enlarge due to the forces against the body of person 200, but remain as small as possible on person 200. These frame adjustments are oriented such that their motion is not influenced by torques or forces exerted by exoskeleton 100 on person 200. Adjustments such as, but not limited to, torso height, torso depth, torso width, or leg length may be configured in this automatically adjusting manner. An additional lock may be configured to fix one or more adjustments of exoskeleton 100 in place once it is worn by person 200. The lock may simultaneously fix or release multiple adjustments on the exoskeleton 100. In this example, person 200 can don exoskeleton 100 with multiple size adjustments unlocked or free, such that exoskeleton 100 can closely match the profile of person 200. Once fit, the multiple size adjustments of exoskeleton 100 can be locked at the same time to secure the fit of exoskeleton 100 on person 200 and allow transfer of supporting torques or forces to person 200 without influencing the size of the adjustments. The locking mechanism can be electromechanical or facilitated through mechanical couplings. The locking interface may be a switch, button, clasp, or automatically triggered in response to the tightening or clipping of belt 121, upper torso interface 122, or other interface of exoskeleton 100. In some examples, at least a portion of the torso frame 102, thigh link 104, or other rigid structure of the exoskeleton 100 frame comprises a series of jointed links, such as a watchband, to allow the exoskeleton 100 to closely conform to the body of a person 200 while keeping the ability to transfer forces and torques in at least one direction. The jointed links may be oriented not to be influenced by the forces exerted by the exoskeleton 100, or they may be lockable.

Figure 12:
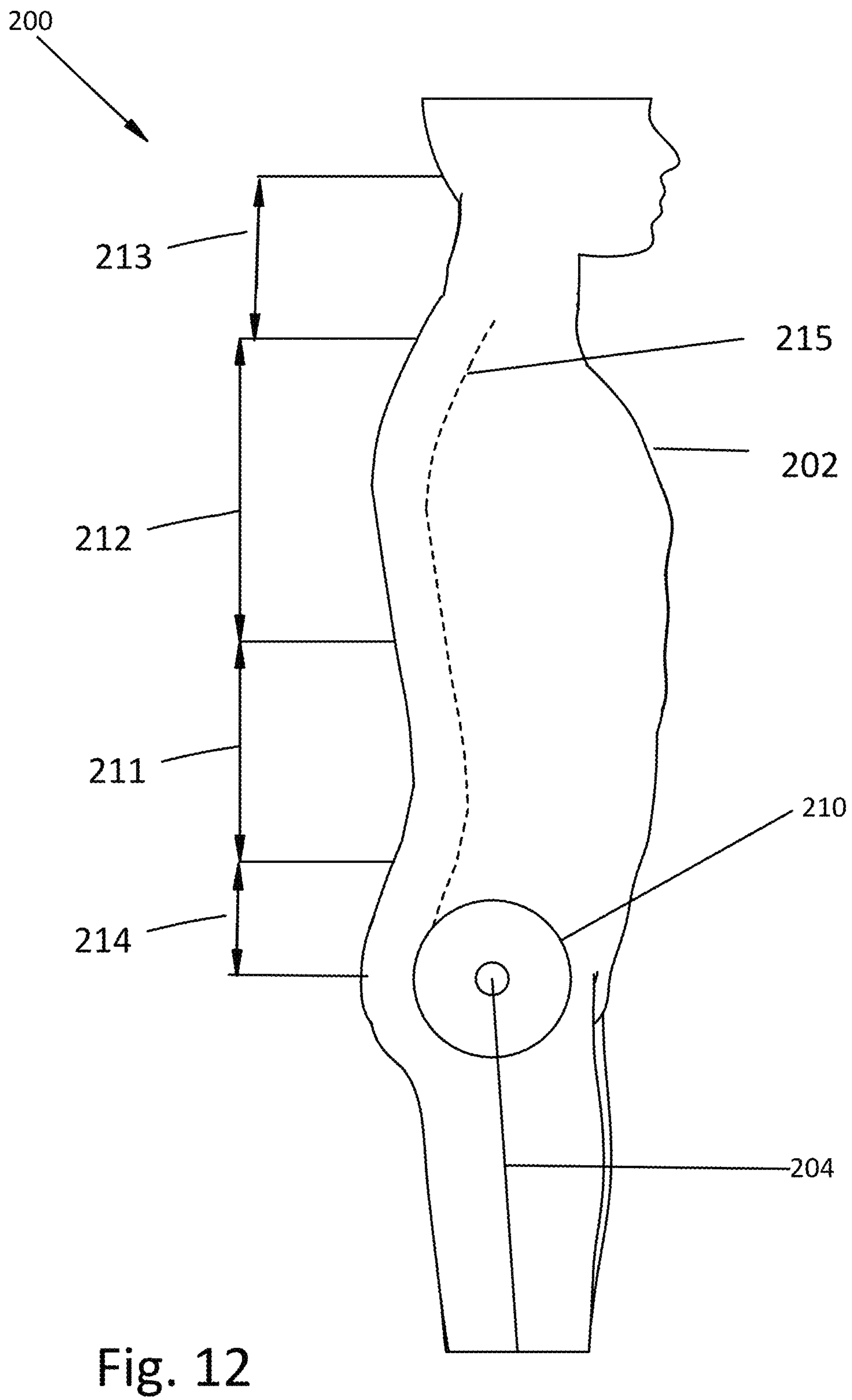
FIG. 12 depicts the motion segments of a person, in accordance with some examples.

When moving, trunk 202 can be divided into several rough structures as shown in FIG. 12, while appreciating that the human body is complex and many more detailed divisions can be made. A person's pelvis 210 corresponds to the person's hips and pelvic structure. It houses the ball joint upon which the thigh 204 rotates and the iliac crest, upon which the belt 121 sits and transfers load or reaction forces. Lumbar section 211 corresponds to the section of trunk 202 along the lumbar vertebrae of the spine, which are responsible for various motions such as forward bending, side bending, and twisting. Lumbar section 211 is where the lordotic curve of trunk 202 is located, a concave curvature of the spine helping with load transfer of the person's bodyweight. When person 200 bends forward, the curve of lumbar section 211 often changes, flattening out as the bend angle increases. Thoracic section 212 corresponds to the spinal section of person 200, where the rib cage is attached. Due to the structure of the rib cage, thoracic section 212 is often less flexible or deforms less during motion compared to lumbar section 211.

Often, when bending forward with exoskeleton 100, thoracic section 212 of person 200 peels away from torso interface 122 or lumbar section 211 contacts torso frame 102 of exoskeleton 100 due to the curvature of trunk 202. In some examples, the range of motion between the upper torso interface 122 and exoskeleton 100, or specifically the torso frame 102, is provided to allow freedom of movement of person 200 and to prevent unwanted contact between trunk 202 and exoskeleton 100. Exoskeleton 100 may therefore comprise spine joint 110 configured to rotationally couple torso interface 122 to torso frame 102 about at least one axis. In some examples, as shown in FIG. 1 and FIG. 2, spine joint 110 is located substantially at the union of thoracic section 212 and lumbar section 211 of trunk 202. Substantially, at refers to as close to a person 200 with training on how to use an exoskeleton 100 could reasonably fit and adjust the exoskeleton 100 such that the spine joint 110 is positioned at the vertical level of the union of thoracic section 212 and lumbar section 211 of trunk 202. Substantially, at may also refer to the positioning of the spine joint 110 such that the torso interface 122 moves with the thoracic section 212 of person 200 when wearing exoskeleton 100, without causing rubbing or chafing on person 200 due to misalignment of joint axes or rotations between the exoskeleton 100 and the body of person 200. The degree of freedom provided by spine joint 110 allows for thoracic section 212 to round relative to lumbar section 211 while exoskeleton 100 is transferring torque to person 200 to minimize profile at the rear of the body, and to prevent undue tightening on torso interface 122 due to differences in motion between exoskeleton 100 and person 200.

As stated previously, torso frame 102 is rotationally coupled to thigh link 104 about hip axis 108, and belt 121 is rotationally coupled to thigh link 104 or torso frame 102 substantially close to hip axis 108. In this configuration, the upper torso interface 122 is configured to move with the thoracic section 212, the torso frame 102 is configured to move with the lumbar section 211, the belt 121 is configured to move with the pelvis 210, and the thigh link 104 is configured to move with the thigh 204. This configuration allows for exoskeleton 100 to closely adhere to the curvature of the body of person 200 when bending to both reduce the profile of exoskeleton 100 and any gap between exoskeleton 100 and the body of person 200. In particular, spine joint 110 reduces the profile of exoskeleton 100 around thoracic section 212, as well as the gap between the back of torso interface 122 and trunk 202 due to the torque of exoskeleton 100 and differences in curvature of exoskeleton 100 and trunk 202 during bending motions. In some examples, torso interface 122 also has a linear degree of freedom relative to torso frame 102 along the axis of the spine of person 200 to compensate for joint misalignment. One of the skills in the art may recognize that many shapes of torso frame 102 may be utilized to connect between the hip axis 108 and the spine joint 110. Exoskeleton 100 avoids cervical section 213 of the spine. Sacral section 214 moves with pelvis 210.

FIG. 1 and FIG. 2 show proper alignment between person 200 and exoskeleton 100. Adjustments in the dimensions of torso frame 102, thigh link 104, belt 121, and upper torso interface 122 may be used to adjust and size exoskeleton 100 to person 200. Properly sized exoskeleton 100 should have the following characteristics: thigh link 104 is oriented parallel to person's thigh 204, hip axis 108 crosses through the person's hip joint between pelvis 210 and person's thigh 204, spine joint 110 is directly posterior to the interface of lumbar section 211 and thoracic section 212 and the back of torso interface 122 is substantially vertical and flush with thoracic section 212. In some examples, the rotational degree of freedom between belt 121 and torso frame 102 is directly above hip axis 108 in sagittal plane 300, and the major axis of torso frame 102 is vertical when person 200 is standing straight. These characteristics allow the exoskeleton 100 to most closely follow the motion of person 200 when bending forward while transferring supportive forces and torques. In some examples, torso interface 122 is angled when the person is standing straight. This gives it the ability to rotate through a straight position orthogonal to the spine of person 200 when person 200 is bending, the position at which torque is transferred most efficiently. In some examples, spine joint 110 is made of a flexible member, is lockable, is spring-loaded, or is damped. Spine joint 110 may comprise a selection of rotary joints, universal joints, ball joints, resilient rods, or flexible materials.

Figure 13:
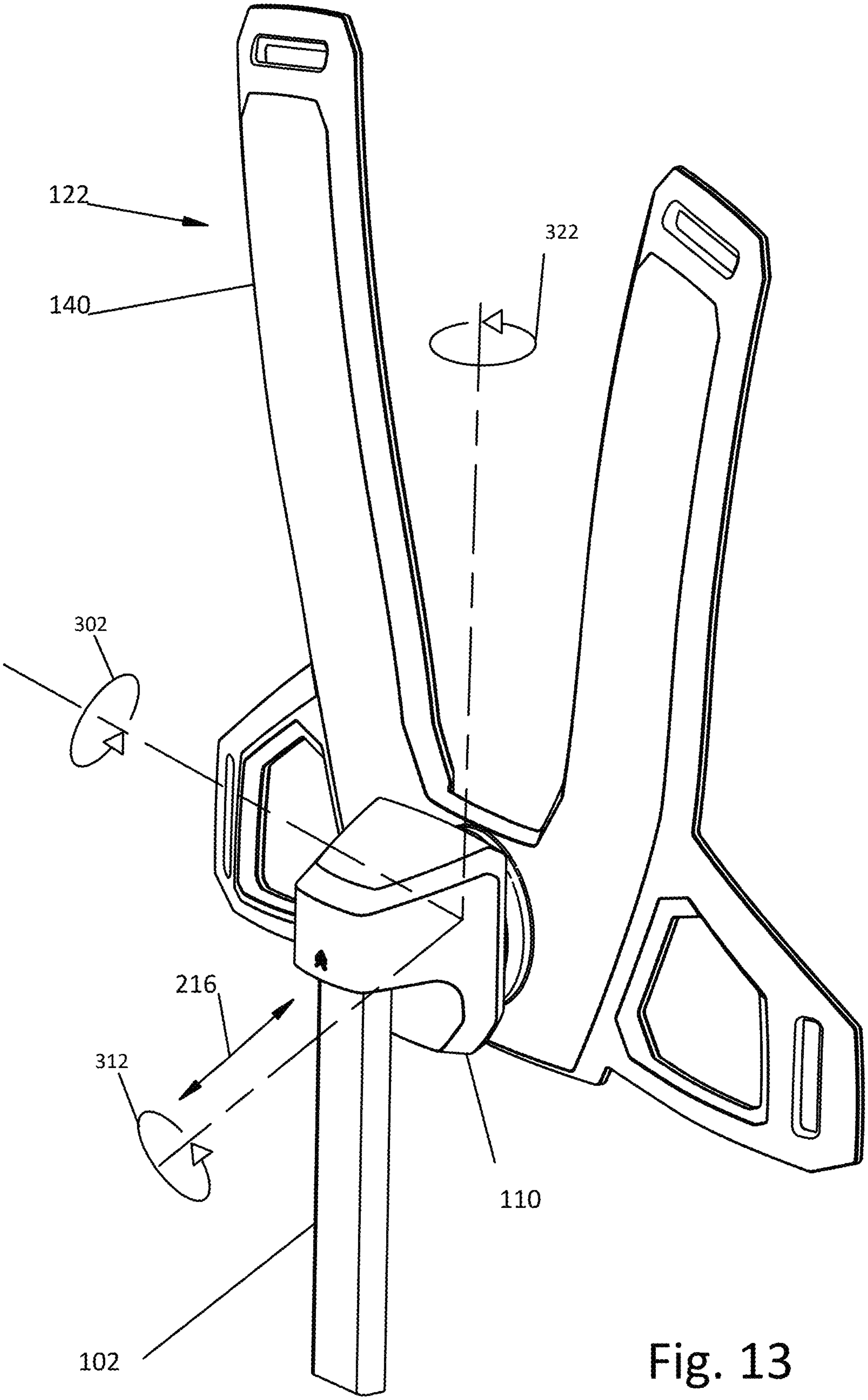
FIG. 13 depicts a rear perspective view of the degrees of freedom provided by the spine joint, in accordance with some examples.

When person 200 is working with exoskeleton 100, such as order picking or palletizing in logistics settings, it is desirable for exoskeleton 100 to provide as much freedom to the movement of trunk 202 as possible, in addition to the supported motion of forward bending. Motions such as twisting and side bending are often required to effectively pick up or put down an object, or to navigate between tight spaces in the environment. In some embodiments, this range of motion is accommodated by spine joint 110 between torso frame 102 and torso interface 122, as shown in FIG. 13. In some examples, spine joint 110 provides three rotational degrees of freedom to exoskeleton 100. Spine joint 110 allows frontal rotation motion 312, sagittal rotation motion 302, and or transverse rotation motion 322 between torso frame 102 and torso interface 122. Motions associated with these rotations are described along with FIG. 3 above.

While wearing the exoskeleton 100, users in logistics settings often transition between lifting boxes and driving a forklift. When driving a forklift, users often lean back into a backrest, whether in a standing or a seated posture. When driving a forklift with an exoskeleton 100, frame 102 will often contact the backrest of the forklift, causing the person to lean against frame 102 instead of the backrest of the forklift. During these driving tasks, the extra degrees of freedom provided between frame 102 and torso interface 122 may prevent person 200 from resting against the backrest of the forklift or provide a generally unstable feeling. Thus, it is desired for exoskeleton 100 to provide an adequate range of motion during non-driving activities to allow person 200 to move freely, but to become at least semi-rigid during driving activities to allow person 200 to rest against exoskeleton 100, similar to how they would a backrest of a forklift. The embodiment below describes spine joint 110 between torso frame 102 and torso interface 122 of exoskeleton 100 with these properties.

Figure 14A:
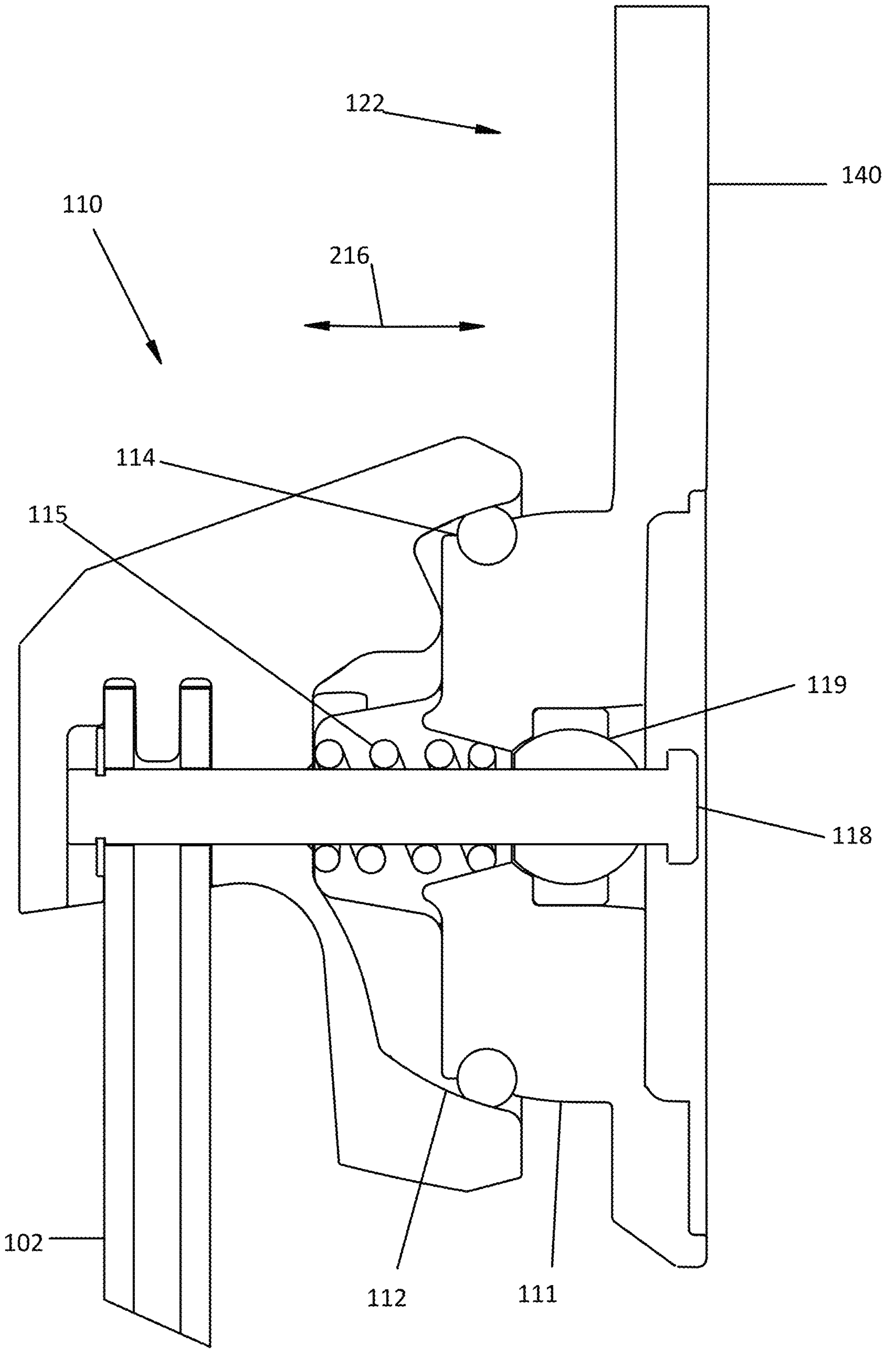
FIGS. 14A and 14B depict a section view of a selectively resistive spine joint, in accordance with some examples.
Figure 14B:
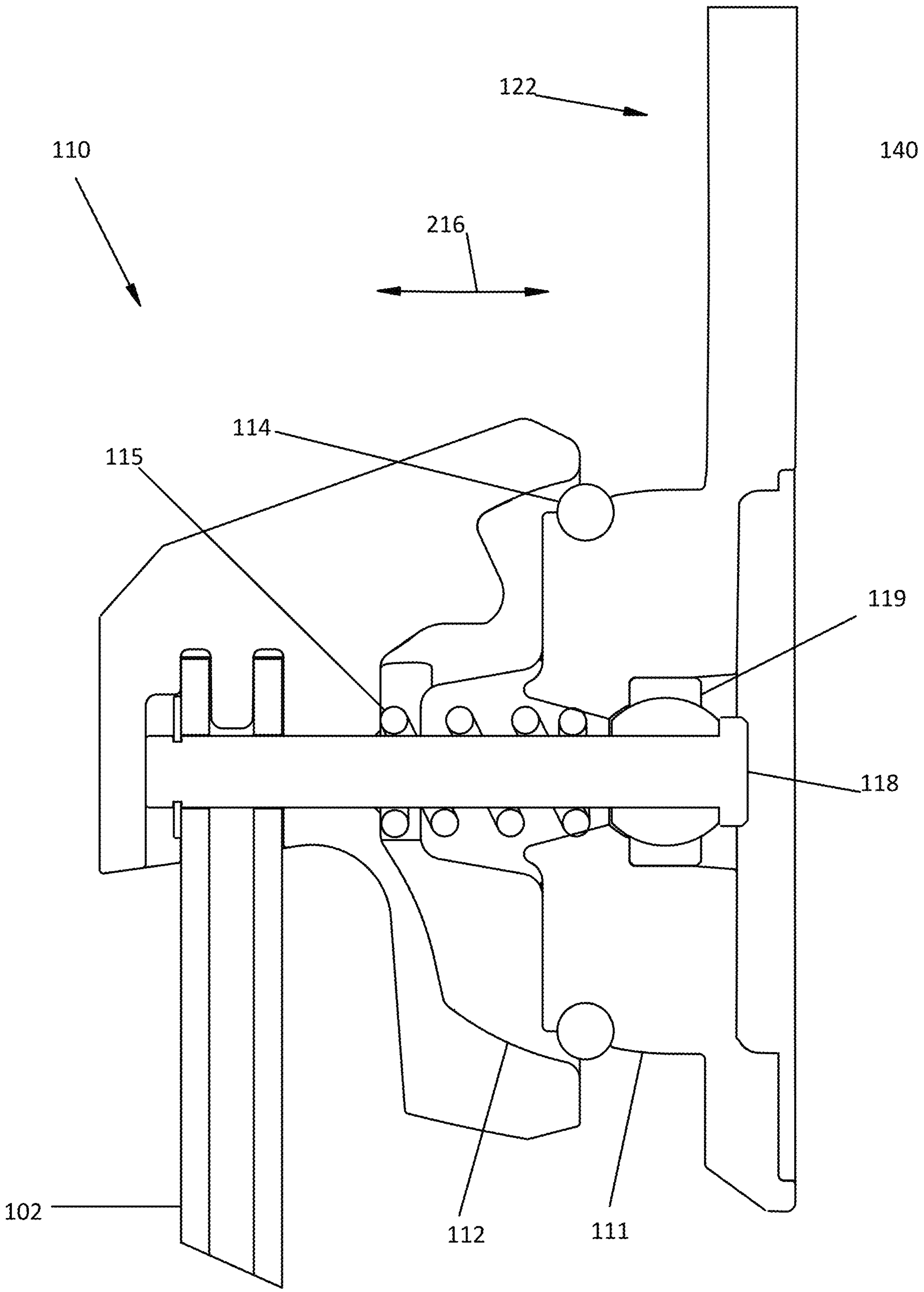

FIGS. 14A and 14B show section views of an embodiment of exoskeleton 100 comprising spine joint 110 that has adjustable flexibility depending on the activity of person 200. FIG. 14A shows spine joint 110 in an unlocked position, FIG. 14B shows the spine joint 110 in a locked position. Spine joint 110 comprises swivel joint 119 that connects torso frame 102 with back panel 140 of torso interface 122 that provides up to three degrees of freedom between torso interface 122 and torso frame 102. Spine joint 110 further comprises linear joint 118 that allows torso interface 122 to move relative to torso frame 102 in linear direction 216 orthogonal to the major axis of the spine of person 200 when wearing exoskeleton 100. In some examples, the linear direction 216 is orthogonal to the frontal plane 310 of person 200, corresponding to frontal translation motion 314 of FIG. 3. Spine joint 110 further comprises first surface 111 coupled to either of torso frame 102 or torso interface 122 and second surface 112 coupled to the other of torso frame 102 or torso interface 122. When torso interface 122 slides relative to torso frame 102 along linear joint 118, first surface 111 and second surface 112 may be made to contact each other or remain separated. In the unlocked position of the spine joint 110 shown in FIG. 14A, first surface 111 is not in contact with second surface 112, allowing torso interface 122 to move relative to torso frame 102 by means of swivel joint 119. In the locked position of the spine joint 110 shown in FIG. 14B, first surface 111 is brought into contact with second surface 112 through motion of torso interface 122 along linear joint 118, restricting the motion of torso interface 122 relative to torso frame 102. This allows person 200 to lean into torso interface 122 like a backrest without torso interface 122 pivoting relative to torso frame 102.

Spine joint 110 is configured to automatically transition between a free configuration and a restricted configuration based on the posture and motions of person 200. Reaction forces from the supportive torque provided by exoskeleton 100 when person 200 is bending will cause spine joint 110 to move into the first position that allows for free motion of torso interface 122 relative to torso frame 102. Reaction forces from the supportive torque provided by the exoskeleton 100 when person 200 is bending will cause torso interface 122 to separate from torso frame 102 along linear joint 118 so that first surface 111 and second surface 112 are not in contact, allowing torso interface 122 to rotate about swivel joint 119. This allows for free motion of person 200 during working postures and motions. When person 200 is seated, leaning against a backrest will cause spine joint 110 to move into the second position that restricts the motion of torso interface 122 relative to torso frame 102. When a seated person 200 leans on a backrest, torso interface 122 will move towards torso frame 102 along linear joint 118 such that first surface 111 and second surface 112 are in contact, restricting motion of torso interface 122 relative to torso frame 102 about swivel joint 119. In this configuration, the torso interface 122 is restricted from moving relative to the torso frame 102 to stabilize the torso interface 122 and allow the person to lean against the exoskeleton 100 as they would the backrest of a chair.

First surface 111 and second surface 112 may be spherical and concentric with swivel joint 119 to correspond to the degree of freedom provided by swivel joint 119. The spherical surface allows for the first surface 111 to move in all directions relative to the second surface 112 to maintain a small gap between the two components is maintained by the linear joint 118. When first surface 111 is pushed against second surface 112 along the linear joint 118, the spherical surface maximizes the contact surface area to aid the locking function between torso interface 122 and torso frame 102. In other examples, first surface 111 and second surface 112 are cylindrical, conical, or of other shapes to correspond to a reduced degree of freedom provided by swivel joint 119.

In the embodiment of FIGS. 14A and 14B, spine joint 110 further comprises spine spring 115 configured to bias first surface 111 away from second surface 112 along linear joint 118. In this manner, spine spring 115 is configured to bias spine joint 110 to a first position wherein torso interface 122 is freely moveable relative to torso frame 102. In some examples, the spine spring 115 is a compression spring. In some examples, the spine spring 115 may be an extension spring, torsion spring, or other compressible resilient material.

In the embodiment of FIGS. 14A and 14B, spine joint 110 further comprises resistive element 114 coupled to one or both of first surface 111 and second surface 112. Resistive element 114 is configured to create friction, resistance, damping, locking, or resilience between the motion of torso interface 122 relative to torso frame 102 when first surface 111 is in contact with second surface 112. In the embodiment of FIGS. 14A and 14B, resistive element 114 comprises a rubber o-ring coupled to first surface 111 configured to compress to conform to and create friction with second surface 112. Spine joint 110 may comprise multiple resistive elements 114 to alter the resistance about swivel joint 119 in its locked position. The cross-section of resistive element 114 is circular, but one of skill in the art may appreciate that it may also be triangular, square, trapezoidal, rectangular, oval, or other cross-sectional shape. Still, in other examples, resistive element 114 may comprise a sheet configured to cover a portion of first surface 111 and or second surface 112. Resistive element 114 may be made of elastic or non-elastic materials with various friction properties when in contact with first surface 111 or second surface 112. Resistive element 114 may lock, damp, or spring load the motion of torso frame 102 relative to torso frame 102 along all directions of swivel joint 119. Still in other embodiments, resistive element 114 comprises a contoured surface layered on top of or embedded into first surface 111 or second surface 112, configured to lock into the other of first surface 111 or second surface 112.

In some examples, the first surface 111 and or second surface 112 are made up of materials to maximize the coefficient of friction between the two. In other examples, the first surface 111 and second surface 112 comprise a series of ridges, contours, or teeth designed to prevent at least one motion of torso interface 122 relative to torso frame 102 when they are in contact.

In some embodiments, first surface 111 or second surface 112 is contoured such that it limits the range of motion of torso interface 122 relative to torso frame 102. This may be done to either limit the range of motion of person 200 while wearing exoskeleton 100, or to limit the range of motion of exoskeleton 100 to aid in donning and doffing. One configuration may be that spine joint 110 may limit torso interface 122 from rotating in the frontal plane 310. The limitation may be greater than the range of motion of person 200, as not to limit the motion of person 200 while wearing the exoskeleton 100, but enough to prevent torso interface 122 from orienting itself upside-down during donning, which could be confusing when putting on exoskeleton 100. In some embodiments, the spine joint 110 further comprises a limiting element configured to selectively allow the torso interface 122 to rotate relative to the torso frame 102 past a given angle, in this example, between 5 and 175 degrees.

In some embodiments, the limiting element may be a quick-release pin. When inserted, the limiting element prevents torso interface 122 from rotating relative to torso frame 102 such that it can become upside down. When the limiting element is removed, torso interface 122 can freely rotate relative to torso frame 102, which may be useful to reduce the overall size of exoskeleton 100 during shipping or storage. In some examples, a limiting element is configured to slide into either the first surface 111 or the second surface 112 and to hard stop against a limiting profile in the other of the first surface 111 or the second surface 112. In some examples, the limiting profile is configured to toggle about the limiting element after sufficient force is applied.

In some examples, exoskeleton 100 is designed to connect to or integrate with the back of a seat when a person is seated with exoskeleton 100. One example of this is when person 200 sits in a forklift to drive. In further examples, the back of the seat may have a cutout to match the profile of exoskeleton 100, so when person 200 sits with exoskeleton 100, they do not feel exoskeleton 100 between the body and the forklift seat but instead feel as if they were sitting in the seat without wearing exoskeleton 100. In some examples, the back of exoskeleton 100 connects to the back and or bottom of the seat to prevent exoskeleton 100 from rotating or sliding relative to the seat. In this configuration, person 200 still feels exoskeleton 100 between their body and the seat, but comfort is increased as exoskeleton 100 is stabilized. In some examples, a charger is integrated into the seat back, configured to charge exoskeleton 100 while person 200 is seated.

In some examples, spine joint 110 is configured to allow torso interface 122 to detach from torso frame 102. This may allow for washing of torso interface 122, replacement of parts, or size minimization of exoskeleton 100 when storing or shipping. Torso frame 102 may also be configured to detach from thigh link 104 or actuator 101 for similar reasons.

Figure 15:
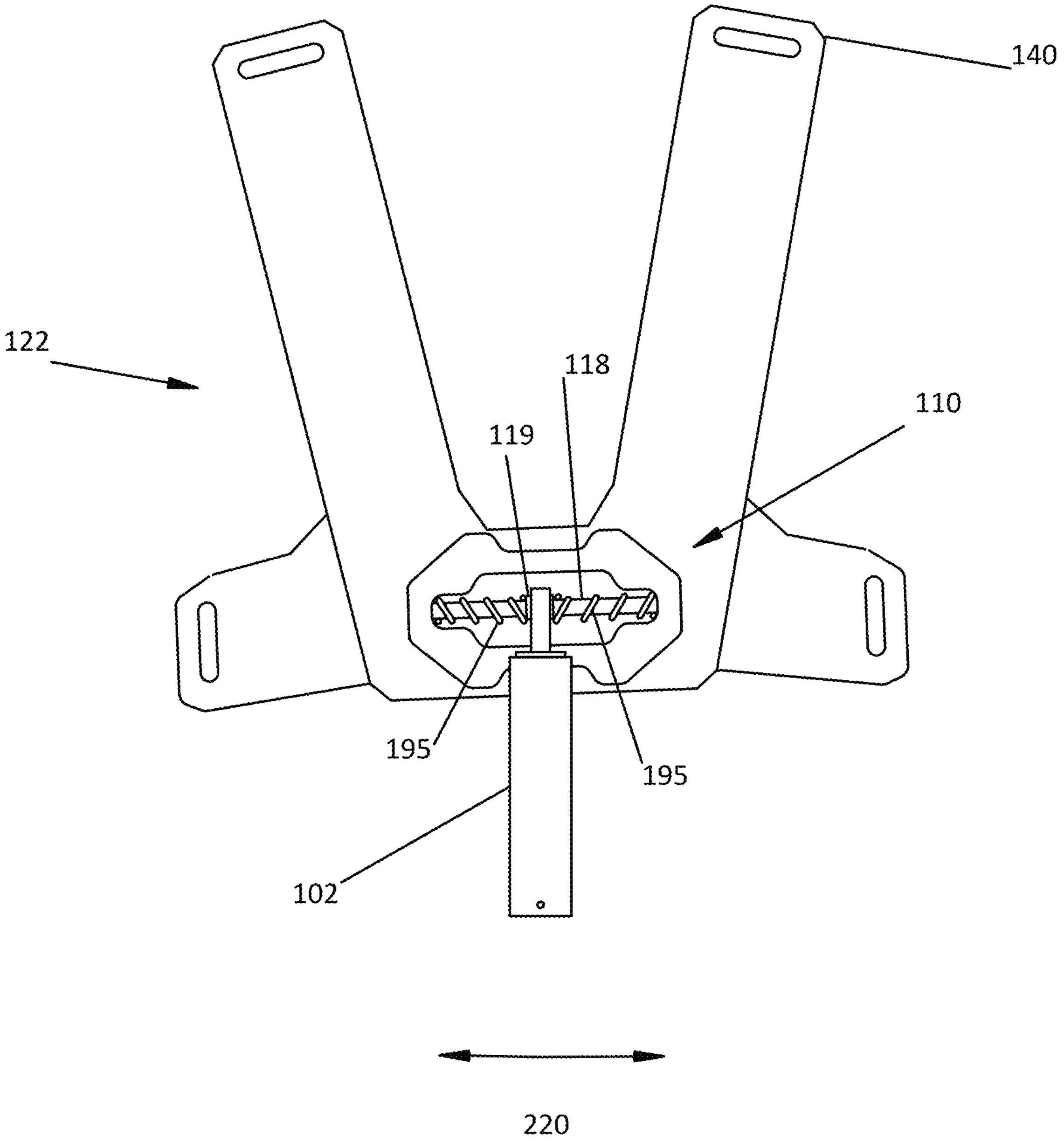
FIG. 15 depicts a rear view of a spring-loaded spine joint, in accordance with some examples.

FIG. 15 shows another embodiment of exoskeleton 100 where torso interface 122 further comprises a linear degree of freedom relative to torso frame 102. In some examples, linear joint 118 is configured such that the motion of torso interface 122 relative to torso frame is along frontal plane 310 of person 200, such that it is minimally affected by the supportive forces and torques generated by exoskeleton 100. In the embodiment of FIG. 15, exoskeleton 100 further comprises linear joint 118 configured to allow torso interface 122 to move relative to torso frame 102 along horizontal direction 220 in frontal plane 310 of person 200, corresponding to sagittal translation motion 304. This horizontal degree of freedom may allow for torso interface 122 to more closely follow the motion of trunk 202 during motions such as walking, twisting, or side bending. In some examples, the linear joint 118 comprises a rail attached to the back panel 140 that interfaces with the interior diameter of swivel joint 119, allowing swivel joint 119 to slide along the rail of linear joint 118. In other examples, swivel joint 119 comprises a t-slot, carriage, linear bearing, or similar mechanism known by one skilled in the art.

In some examples, exoskeleton 100 further comprises at least one centering spring 195 configured to bias torso interface 122 to a centered position relative to torso frame 102 about linear joint 118. centering spring 195 may consist of a resisting, resilient, or damping element made of metal, rubber, plastic, carbon, or other suitable material. In the embodiment of FIG. 15 exoskeleton 100 comprises two coil centering springs 115 to bias the torso interface 122 to a centered position on the torso frame 102, one on each side of the swivel joint 119. The profile of linear joint 118 includes hard stops configured to limit the translation or rotation of torso interface 122 relative to torso frame 102. Linear joint 118 may be combined with rotation or translation degrees of freedom in other directions or planes. In some examples, linear joint 118 may be oriented in vertical or diagonal directions in frontal plane 310 of person 200.

Conclusion

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A torso interface for an exoskeleton, the torso interface comprising:

a back panel configured to locate behind a back of a person when the exoskeleton is worn by the person;

a harness configured to transfer tensile forces and to at least partially encircle a shoulder of the person, the harness coupled to the back panel in at least two locations;

a chest panel moveably coupled to the harness, the chest panel configured to contact a chest of the person when the exoskeleton is worn by the person, wherein the chest panel separates the harness into a superior segment, located above the shoulder, and a lateral segment, located beside a trunk of the person;

an adjustment mechanism configured to adjust a length of the harness, the adjustment mechanism located along the superior segment or between connection of the superior segment and the back panel, wherein the adjustment mechanism allows for a length adjustment of the superior segment and an indirect length adjustment of the lateral segment through motion of the chest panel along the harness;

an additional harness coupled to the back panel and configured to at least partially encircle an additional shoulder of the person;

an additional chest panel, configured to slide relative to the additional harness;

a sternum strap, configured to connect the chest panel and the additional chest panel;

a routing element coupled to the chest panel, the routing element configured to route the harness such that no tensile forces are transferred through the chest panel and the chest panel freely slides along the harness; and an additional routing element coupled to the additional chest panel, the additional routing element configured to route the additional harness such that no tensile forces are transferred through the additional chest panel and the additional chest panel freely slides along the additional harness, wherein:

the sternum strap is configured to connect the routing element to the additional routing element such that no tensile forces are transferred through the chest panel or the additional chest panel.

2. The torso interface of claim 1, wherein, when the person bends while wearing the exoskeleton, the chest panel slides along the harness such that the chest panel remains in a same location on the chest of the person.

3. The torso interface of claim 1, wherein, when the person wears the exoskeleton, the chest panel slides along the harness such that tensile forces in the superior segment and tensile forces in the lateral segment remain balanced.

4. The torso interface of claim 1, wherein:

the torso interface is configured to apply a support torque created by the exoskeleton to the person as a supportive force on the chest of the person, the back panel is configured to receive reaction forces and torques from a supporting torque of the exoskeleton, and the chest panel is configured to distribute tensile forces in the harness as the supportive force on the chest of the person.

5. The torso interface of claim 1, wherein the back panel is rotatably coupled to the exoskeleton approximately at a level of a transition between a lumbar section and a thoracic section of a spine.

6. The torso interface of claim 1, wherein the routing element comprises one or more components selected from the group consisting of a metal D-ring, a plastic D-ring, a tri-ring, a circular ring, a rectangular ring, a loop, a pulley, a bent tube, a block, and a sheave.

7. The torso interface of claim 1, further comprising a limiting element configured to selectively prevent the chest panel from sliding relative to the harness in at least one direction.

8. The torso interface of claim 7, wherein the limiting element prevents the chest panel from moving along the harness only in a direction that corresponds to shortening of the superior segment and lengthening of the lateral segment.

9. The torso interface of claim 8, wherein the limiting element comprises a strap coupled between the chest panel and a belt of the exoskeleton or person.

10. The torso interface of claim 9, wherein the limiting element is adjustable in length to fit various sizes of the person or to position the chest panel at different levels on the chest of the person.

11. The torso interface of claim 8, wherein the limiting element is configured between the chest panel and the harness and comprises one or more selected from the group consisting of a clamp, a cam lock, a ladder lock, a cleat, a triglide, a screw, a pin, a clutch, and a ratcheting pulley.

12. A torso interface for an exoskeleton, the torso interface comprising:

a back panel configured to locate behind a back of a person when the exoskeleton is worn by the person;

a harness configured to transfer tensile forces and to at least partially encircle a shoulder of the person, the harness coupled to the back panel in at least two locations;

a chest panel moveably coupled to the harness, the chest panel configured to contact a chest of the person when the exoskeleton is worn by the person, wherein the chest panel separates the harness into a superior segment, located above the shoulder, and a lateral segment, located beside a trunk of the person; and an adjustment mechanism configured to adjust a length of the harness, the adjustment mechanism located along the superior segment or between connection of the superior segment and the back panel, wherein the adjustment mechanism allows for a length adjustment of the superior segment and an indirect length adjustment of the lateral segment through motion of the chest panel along the harness, wherein:

the torso interface is configured to apply a support torque created by the exoskeleton to the person as a supportive force on the chest of the person, wherein:

the back panel is configured to receive reaction forces and torques from a supporting torque of the exoskeleton, the chest panel is configured to distribute tensile forces in the harness as the supportive force on the chest of the person, and the chest panel transfers the supportive force to the person, the chest panel slides along the harness such that tensile forces in the superior segment and the tensile forces in the lateral segment are balanced.

13. The torso interface of claim 1, wherein:

the superior segment connects to the back panel substantially along an outer profile of the torso between a neck and the shoulder of the person, and the lateral segment connects to the back panel substantially along the outer profile of the torso between an armpit and a waist of the person.

14. The torso interface of claim 13, wherein the back panel is substantially rigid such that neither the superior segment nor the lateral segment acts to compress the torso near the back panel when tensile forces are transferred through the harness.

15. The torso interface of claim 14, wherein the back panel further comprises:

a first panel;

a second panel coupled to the harness and moveably coupled to the first panel; and a spring configured to bias the second panel towards the first panel, wherein:

when the exoskeleton is worn by the person, tensile forces in the harness balance with forces from the spring such that a connection between the harness and the second panel is substantially along the outer profile of the torso.

16. A torso interface for an exoskeleton, the torso interface comprising:

a back panel configured to locate behind a back of a person when the exoskeleton is worn by the person;

a harness configured to transfer tensile forces and to at least partially encircle a shoulder of the person, the harness coupled to the back panel in at least two locations;

a chest panel moveably coupled to the harness, the chest panel configured to contact a chest of the person when the exoskeleton is worn by the person, wherein the chest panel separates the harness into a superior segment, located above the shoulder, and a lateral segment, located beside a trunk of the person;

an adjustment mechanism configured to adjust a length of the harness, the adjustment mechanism located along the superior segment or between connection of the superior segment and the back panel, wherein the adjustment mechanism allows for a length adjustment of the superior segment and an indirect length adjustment of the lateral segment through motion of the chest panel along the harness; and a linear joint coupling the torso interface to a torso frame such that the torso interface can move relative to the torso frame along a linear direction, wherein:

when the torso interface is at a first position relative to the exoskeleton along the linear direction, the torso interface is able to rotate relative to the exoskeleton in at least one direction, and when the torso interface is at a second position relative to the exoskeleton along the direction, movement between the torso interface and the exoskeleton is damped, spring-loaded, or fixed in the at least one direction.

17. The torso interface of claim 1, further comprising a routing element coupled to the chest panel, the routing element configured to route the harness such that no tensile forces are transferred through the chest panel and the chest panel freely slides along the harness.

18. The torso interface of claim 17, wherein the routing element is made of a low-friction material and defines a bend radius in the harness such that the chest panel is able to freely move along the harness.

19. The torso interface of claim 16, further comprising:

an additional harness coupled to the back panel and configured to at least partially encircle an additional shoulder of the person;

an additional chest panel, configured to slide relative to the additional harness; and a sternum strap, configured to connect the chest panel and the additional chest panel.

20. The torso interface of claim 19, further comprising:

a routing element coupled to the chest panel, the routing element configured to route the harness such that no tensile forces are transferred through the chest panel and the chest panel freely slides along the harness; and an additional routing element coupled to the additional chest panel, the additional routing element configured to route the additional harness such that no tensile forces are transferred through the additional chest panel and the additional chest panel freely slides along the additional harness, wherein:

the sternum strap is configured to connect the routing element to the additional routing element such that no tensile forces are transferred through the chest panel or the additional chest panel.

* * * * *